(12) United States Patent
DeRose et al.

(10) Patent No.: US 6,546,406 B1
(45) Date of Patent: Apr. 8, 2003

(54) CLIENT-SERVER COMPUTER SYSTEM FOR LARGE DOCUMENT RETRIEVAL ON NETWORKED COMPUTER SYSTEM

(75) Inventors: Steven J. DeRose, E. Providence, RI (US); William C. Smith, Providence, RI (US)

(73) Assignee: Enigma Information Systems Ltd., Bnei Brak (IL)

( * ) Notice: Subject to any disclaimer, the term of this patent is extended or adjusted under 35 U.S.C. 154(b) by 0 days.

(21) Appl. No.: 09/190,604

(22) Filed: Nov. 12, 1998

Related U.S. Application Data

(63) Continuation of application No. 08/552,553, filed on Nov. 3, 1995, now abandoned.

(51) Int. Cl.[7] .............................................. G06F 17/00
(52) U.S. Cl. ........................ 707/513; 707/523; 707/522
(58) Field of Search ................................. 707/514, 513, 707/100, 523, 102, 501.1, 522; 704/5; 709/247

(56) References Cited

U.S. PATENT DOCUMENTS

| | | | |
|---|---|---|---|
| 4,539,653 A | 9/1985 | Bartlett et al. | 364/900 |
| 4,587,633 A | 5/1986 | Wang et al. | 364/900 |
| 4,594,674 A | 6/1986 | Boulia et al. | 364/523 |
| 4,608,664 A | 8/1986 | Bartlett et al. | 364/900 |
| 4,710,885 A | 12/1987 | Litteken | 364/518 |
| 4,716,404 A | 12/1987 | Tabata et al. | 340/723 |
| 4,803,643 A | 2/1989 | Hickey | 364/523 |
| 4,823,303 A | 4/1989 | Terasawa | 364/521 |
| 4,876,665 A | 10/1989 | Iwai et al. | 364/900 |
| 4,912,669 A | 3/1990 | Iwamoto et al. | 364/900 |
| 4,969,093 A | 11/1990 | Barker et al. | 364/900 |
| 4,992,972 A | 2/1991 | Brooks et al. | 364/900 |
| 4,996,665 A | 2/1991 | Nomura | 364/900 |
| 5,001,654 A | 3/1991 | Winiger et al. | 364/523 |
| 5,008,853 A | 4/1991 | Bly et al. | 364/900 |
| 5,068,809 A | 11/1991 | Verhelst et al. | 395/145 |
| 5,079,700 A | 1/1992 | Kozoll et al. | 395/700 |
| 5,089,956 A | 2/1992 | MacPhail | 395/600 |
| 5,108,206 A | 4/1992 | Yoshida | 400/61 |
| 5,113,341 A | 5/1992 | Kozol et al. | 364/419 |
| 5,119,491 A | 6/1992 | Iwai et al. | 395/600 |
| 5,130,924 A | 7/1992 | Barker et al. | 364/419 |
| 5,133,051 A | 7/1992 | Handley | 395/148 |
| 5,140,521 A | 8/1992 | Kozol et al. | 364/419 |
| 5,140,676 A | 8/1992 | Langelaan | 395/145 |
| 5,142,615 A | 8/1992 | Levesque et al. | 395/131 |
| 5,144,555 A | 9/1992 | Takadachi et al. | 364/419 |
| 5,144,557 A | 9/1992 | Wang et al. | 364/419 |
| 5,146,552 A | 9/1992 | Cassorla et al. | 395/145 |
| 5,173,853 A | 12/1992 | Kelly et al. | 364/419 |
| 5,181,162 A | 1/1993 | Smith et al. | 364/419 |
| 5,182,709 A | 1/1993 | Makus | 364/419 |
| 5,185,698 A | 2/1993 | Hesse et al. | 364/419 |
| 5,202,977 A | 4/1993 | Pasetes, Jr. et al. | 395/500 |
| 5,214,696 A | 5/1993 | Keiser, II et al. | 380/4 |
| 5,220,657 A | 6/1993 | Bly et al. | 395/425 |
| 5,241,624 A | 8/1993 | Torres | 395/129 |

(List continued on next page.)

OTHER PUBLICATIONS

Morgenstern, Dynaweb Server Holds SGML Books, MacWEEK, v.8 n.28, p. 12(1).

(List continued on next page.)

Primary Examiner—Joseph H. Field

(57) ABSTRACT

A client-server system for making electronically published documents available over a computer network processes electronically published documents in a first markup language into document in a second markup language using a mapping table. A client viewer can request a portion of the electronically published document and the server sends only the selected portion, converted to the second markup language. If the selected portion is too big, the server can send a summary review such as a table of contents and description of the selected document.

19 Claims, 17 Drawing Sheets

U.S. PATENT DOCUMENTS

| | | | |
|---|---|---|---|
| 5,241,671 A | 8/1993 | Reed et al. | 395/600 |
| 5,276,793 A | 1/1994 | Borgendale et al. | 395/148 |
| 5,285,526 A | 2/1994 | Bennett, III et al. | 395/100 |
| 5,293,473 A | 3/1994 | Hesse et al. | 395/146 |
| 5,355,497 A | 10/1994 | Cohen-Levy | 395/700 |
| 5,367,621 A | 11/1994 | Cohen et al. | 395/154 |
| 5,384,703 A | 1/1995 | Withgott et al. | 364/419.1 |
| 5,428,529 A | 6/1995 | Hartrick et al. | 364/419.1 |
| 5,491,820 A | 2/1996 | Belove et al. | 395/600 |
| 5,495,607 A | 2/1996 | Pisello et al. | 395/600 |
| 5,524,253 A | 6/1996 | Pham et al. | 395/800 |
| 5,530,852 A | 6/1996 | Meske, Jr. et al. | 707/513 |
| 5,546,577 A | 8/1996 | Marlin et al. | 395/600 |
| 5,553,216 A | 9/1996 | Yoshioka et al. | 395/145 |
| 5,553,284 A | 9/1996 | Barbara et al. | 395/600 |
| 5,557,720 A | 9/1996 | Brown, Jr. et al. | 395/146 |
| 5,557,722 A | 9/1996 | DeRose et al. | 395/148 |
| 5,572,643 A | 11/1996 | Judson | 395/793 |
| 5,613,134 A | 3/1997 | Lucus et al. | 395/788 |
| 5,623,652 A | 4/1997 | Vora et al. | 395/610 |
| 5,634,051 A | 5/1997 | Thomson | 395/605 |
| 5,644,776 A | 7/1997 | DeRose et al. | 395/761 |
| 5,708,806 A | 1/1998 | DeRose et al. | 395/615 |
| 5,740,425 A * | 4/1998 | Povilus | 707/100 |
| 5,848,386 A * | 12/1998 | Motoyama | 704/5 |
| 6,038,573 A * | 3/2000 | Parks | 707/513 |
| 6,085,196 A * | 7/2000 | Motoyama et al. | 707/102 |
| 6,182,092 B1 * | 1/2001 | Francis et al. | 707/513 |
| 6,279,015 B1 * | 8/2001 | Fong et al. | 707/523 |

OTHER PUBLICATIONS

Seybold, Toos for Internet Publishing, Seybold Report on Publishing Systems, v.24, n.3, p. S16(5).

Seybold, SGML In The News, The Seybold Report on Publishing Systems, v.23, n.19, p. 31(2).

Michalski, Content in Context, RELease 1.0, v.94, n.9, p. 1(13).

Brian K. Reid, "Scribe: A Document Specification Language under its Compiler.", University Microfilms International, Dissertation Services (1991), pp. 53–141.

Bishop et al., "Xpress Yourself," MacUser, v.8, n.11, p. B17(9), Nov. 1992.

"EBT announces plans to support important new publishing standard: DSSSL", http://www.sil.org/SGML/ebt DSSSL.html.

"HTML to the Max: A manifesto for Adding SGML Intelligence to the World–Wide Web".

Sperburg–McQueen et al. , http://www.ncsa.uiuc.edu/SDG/IT94/Proceedings/Autools/sperburg–mcqueen/sperburg.html.

"A technique for Sharing Data Among Elements of a Hierarchic Document," disclosed anonymously, No. 28983.

"Intelligent Text and Image Handling", Proceedings of RIAO '90, Apr. 2–5, 1991, Barcelona, Spain, (Amsterdam: Elsevier Publishers 1991), pp. 226–244.

Chamberlin, D., "Managing Properties in a System of Cooperating Editors", Proc. Int. Conf. On Electronic Publishing, Gaithersburg, MD, Sep. 1990 (Cambridge: Cambridge University Press, 1990), pp. 31–46.

Chamberlin et al., "Quill: an Extensible system for Editing Documents of Mixed Type," IEEE 1988, pp. 317–326.

J.H. Combs, A.H. Renear, and S.J. DeRose, "Markup Systems and the Future of Scholarly Text Processing," Comm. of the Assoc. For Computing Machinery, Nov. 1987, pp 933–947.

S.J. DeRose, D.G. Durand, E. Mylonas and A.H. Renear, "What is Text, Really?" Journal of computing in Higher Education, 1990, vol. I, No. 2, pp. 3–26.

S.J. DeRose, "CDWord Tutorial," Dallas: CDWord project, Dallas Theological Seminary, 1989.

S.J. DeRose and D.G. Durand, "Applications of Hypertext to Humanistic Textual Scholarship," manuscript submitted Jul. 22, 1987 for Hypertext '87 conference.

R. Furuta, J. Scofield, and A. Shaw, Documenting Formatting Systems: Survey, Concepts, and Issues, Computing Surveys 14(3), 1982, pp. 417–472.

P. Kahn , Webs, Trees, and Stacks: How Hypermedia System Design Affects Hypermedia Content, Proceedings of Third International Conf. On Human–Computer Interaction, Boston, MA, Sep. 18–22.

S.P. Mudur, A.W. Narwekar and A. Moitra , "Design of Software for Text Composition," Software–and Experience (9), 1979; pp; 313–323.

J.R. Remde, L.M. Gomez, and T.K. Landaur, "SuperBook; an Automatic Tool for Information Exploration–Hypertext?", Proceedings of Hypertext '87 Chapel Hill; Dept. of Computer Science, U of N. Carolina.

J.B. Smith and S.F. Weiss, "Formatting Texts Accessed Randomly," Textlab Report TR85–031, Chapel U of North Carolina, 1985.

D. Kurth, "The Art of Computer Programming," (Reading, Mass.; Addison–Wesley, 1973, pp. 332–338, 347–362.

N. Yankelovich, N. Meyrowitz, and A. van Dam, "Reading and Writing the Electronic Book," IEEE 18 (1985), pp. 15–30.

K. Robertson, J.M. Kelsey, and V. Yenbut, "ESP User's Guide," U. Of Washington, Computer Science Lab. Tech. Note #134, Rev. C. Sep. 20, 1982.

A.C. Shaw, "A Model for Document Preparation Systems," U. Of Washington, Dept. of Computer Tech. Report No. 80–04–02, Apr., 980.

M.J. Fischer and R.E. Ladner, "Data Structures for Efficient Implementation of Sticky Pointers in Text Editors," U. Of Washington, Dept. Of Computer Science, Tech. Report No. 79–06–08, Jun. 1979.

T. Allen, R. Nix, and a, Perlin, "PEN: A Hierarchical Document Editor," In Proc. ACM Sigplan Sigoia Symp. Text Manipulation, Sigplan Notices (SCM) 16,6 (Jun. 1981), pp. 74–81.

S.A. Wever, "The Design of a dynamic book for information search," the J. Man–Machine Studies (1982), 17, 87–107.

M.E. Frisse, Searching for Information in a Hypertext Medical Handbook,: Hypertext '87 Proceedings, Chapel Hill, North Carolina, 1987–, Nw York; ACM, pp. 57–66.

C.H. Irby, "Display Techniques for Interactive Text Manipulation," AFIPS Conference Proceedings, 1974 National Computer conf. And Exposition, vol. 43, Montvale, New Jersey; AFIPS Press, 1974.

D. Thursh and F. Mabry "An Interactive Hyper–Text of Pathology," Proceedings of Fourth Annual Symposium on computer Applications in Medical Care, Nov. 1980.

S.A. Wevre and A.H. Borning, "A Prototype Electronic Encyclopedia," ACM Transactions on Office Systems, vol. 3, No. 1, Jan. 1985, pp. 63–88.

J.S. Brown, "Process Versus Product: A Perspective on Tools for communal and Informal Electronic Learning," J. Educational Computing Research, vol. 1(2), 1985, pp. 179–201.

D.D. Chamberlin et al., "Janus: An Interactive System for Document Composition," In proc. ACM Sigplan Notices (ACM) 16.6 (Jun. 1981), pp. 82–91.

C. Binder, "The Window Book Technology," Cambridge, Massachusetts: Box Company, 1986.

S.A. Borkin and J.M. Prager, Some Issues in the Design of an Editor–Formatter for Structured IBM Cambridge Scientific Center Technical Report No. G320–2136, Sep. 1981.

D.C. Engelbart and W.K. English, "A Research Center for Augmenting Human Intellect," In Proc. Fall Joint Computer Conf., vol. 33, AFIPS Press, Arlington, Virginia, pp. 395–410.

N. Wirth, "Data Structures and Algorithms," Englewood Cliffs, New Jersey, Prentice Halls, 1976, pp. 242–245.

Chamberlin et al., "Janus: An interactive document formatter based on declarative tags", IBM Systems Inl. 21(3) 1982: 250–271.

"Distributed Bindery Control System," 240/Research Disclosure Apr. 1993, disclosed anonymously, No. 34829.

* cited by examiner-

```
        <!ENTITY EBT CDATA
           "ELECTRONIC BOOK TECHNOLOGIES, INC.">
45~<BOOK>
      <FRONTMATTER>
        <TITLE>HOW TO USE DYNATEXT</TITLE>
        <AUTHOR>&EBT;</AUTHOR>
      </FRONTMATTER>
46~<BODY>
        <CHAPTER>
          <CHAPTITLE>INTRODUCTION</CHAPTITLE>
          <SECTION>
            <SECTITLE>STARTING UP THE SYSTEM</SECTITLE>
            <P>TO START THE SYSTEM, TYPE
              <EMPH>DTEXT</EMPH></P>
            <P>AFTER THAT JUST BROWSE, AS SHOWN HERE:
49~        <ART FILE ="MYFIG12">
            </P>
48~   </SECTION></></BODY>
47~</BOOK>
```

Fig. 4

BOOK,FRONTMATTER,TITLE,BOOK,FRONTMATTER,
AUTHOR,BOOK,BODY,CHAPTER,CHAPTITLE,BOOK,
BODY,CHAPTER,SECTION,SECTITLE,BOOK,BODY,
CHAPTER,SECTION,P,EMPH,BOOK,BODY,CHAPTER,
SECTION,P,ART

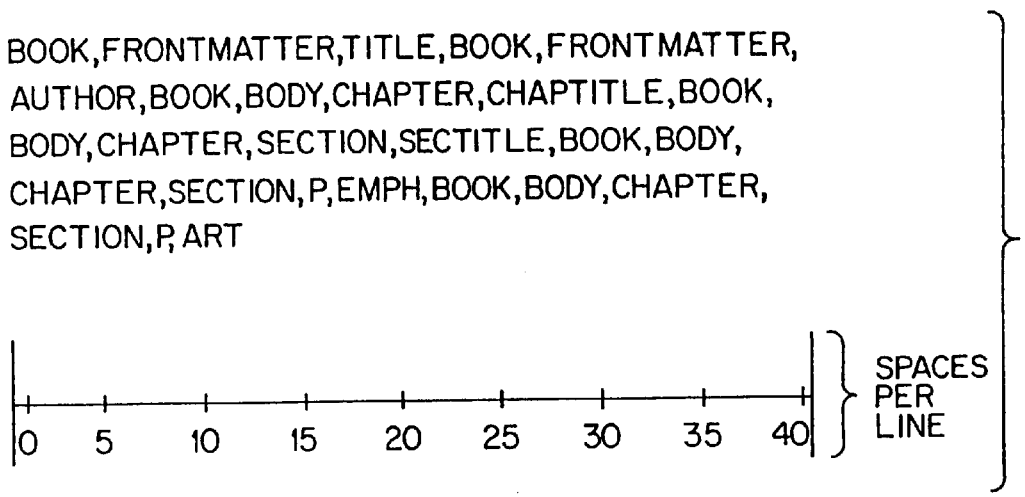

Fig. 7

| | 92 | 94 | 96 | 98 | 100 | 102 | 104 |
|---|---|---|---|---|---|---|---|
| 70 | NIL | 71 | 76 | NIL | NIL | BOOK | NULL |
| 71 | 70 | 72 | 74 | NIL | 76 | BOOK,FM | NULL |
| 72 | 71 | 73 | 73 | NIL | 74 | BOOK,FM,TITLE | NULL |
| 73 | 72 | NIL | NIL | NIL | NIL | #TEXT | <POINTER> |
| 74 | 71 | 75 | 75 | 72 | NIL | BOOK,FM,AUTHOR | NULL |
| 75 | 74 | NIL | NIL | NIL | NIL | #TEXT | <POINTER> |
| 76 | 70 | 77 | 77 | 71 | NIL | BOOK,BODY | NULL |
| 77 | 76 | 78 | 80 | NIL | NIL | BOOK,BODY,CHAP | NULL |
| 78 | 77 | 79 | 79 | NIL | 80 | BOOK,BODY,...CHAPTITLE | NULL |
| 79 | 78 | NIL | NIL | NIL | NIL | #TEXT | <POINTER> |
| 80 | 77 | 81 | 87 | 78 | NIL | ... | NULL |
| 81 | 80 | 82 | 82 | NIL | 83 | ETC. | NULL |
| 82 | 81 | NIL | NIL | NIL | NIL | ... | <POINTER> |
| 83 | 80 | 84 | 85 | 81 | 87 | ... | NULL |
| 84 | 83 | NIL | NIL | NIL | 85 | ... | <POINTER> |
| 85 | 83 | 86 | 86 | 84 | NIL | ... | NULL |
| 86 | 85 | NIL | NIL | NIL | NIL | ... | <POINTER> |
| 87 | 80 | 88 | 89 | 83 | NIL | ... | NULL |
| 88 | 87 | NIL | NIL | NIL | 89 | ... | <POINTER> |
| 89 | 87 | NIL | NIL | 88 | NIL | ... | <POINTER> |

PARENT / FIRST CHILD / LAST CHILD / LEFT SIBLING / RIGHT SIBLING / TYPE NAME / TEXT CONTENT

Fig. 6

TABLE OF CONTENTS — 162

BICYCLE

30 BICYCLE MAINTENANCE MANUAL
  29 BRAKES
    1 GENERAL
    3 HOW CALIPER BRAKES WORK
    1 LUBRICATION
    16 ROUTINE ADJUSTMENTS
      16 CALIPER BRAKES
        11> BRAKE SHOES:
        3 CABLES:
          PIVOT BOLT ADJUSTMENT SIDE-
      PULL BRAKES:
      2 ROLLER LEVER BRAKES
      2" REPLACING AND DISASSEMBLING PARTS

TABLE OF CONTENTS — 160

BICYCLE

30 BICYCLE MAINTENANCE MANUAL
  29 >"BRAKES
    "STAYING ABOARD
    1 "WHEELS
    "POWER TRAIN

TEXT VIEW

ROUTINE ADJUSTMENTS
CALIPER BRAKES
BRAKE SHOES:

BRAKE [SHOES]:

THESE NEED TO BE ALIGNED SO THAT THE SHOE HITS THE RIM SQUARELY:

BRAKE [SHOES] ARE HELD ON EITHER BY A CONVENTIONAL BOLT:

OR AN EYEBOLT:

IN EITHER CASE, LOOSEN NUT A, ADJUST BRAKE SHOE TO MEET RIM, AND TIGHTEN. ONE METHOD IS TO LOOSEN NUT A JUST A LITTLE BIT AND GENTLY TAP THE SHOE

LOOKUP WINDOW — 168

FILE   LISTS   SETTINGS   HELP

LIST OF NAMES:
SEAT
STAND
BRAKES
CABLES
RIM
SHOES

CURRENT: SHOES
ENTER TERM:

[PREVIOUS] [CLEAR] [NEXT]

| TEXT VIEW |
BICYCLE MAINTENANCE MANUAL
BRAKES
REPLACING AND DISASSEMBLING PARTS

REPLACING AND DISASSEMBLING PARTS

*BRAKE SHOES:*

176— ☐ SEE P. 218.

*CABLES:*

THE FREQUENCY WITH WHICH YOU WILL NEED TO REPLACE BRAKE (AND OTHER) CABLES DEPENDS ON HOW YOU USE YOUR BIKE. MACHINES CONSISTENTLY LEFT OUT IN THE RAIN, OR USED HARD EVERY DAY, ARE GOING TO NEED THEM SOONER THAN WELL-CARED-FOR OR AVERAGE-USE MACHINES. THERE IS NO HARD AND FAST RULE. ANY OBVIOUS DEFECT, SUCH AS A FRAYED CABLE, SHOULD BE CONSIDERED FOR REPLACEMENT.

| TEXT VIEW |
BICYCLE MAINTENANCE MANUAL
BRAKES
ROUTINE ADJUSTMENTS

ROUTINE ADJUSTMENTS

CALIPER BRAKES

WHATEVER KIND OF CALIPER BRAKE SYSTEM YOU HAVE, THERE ARE TWO BASIC KINDS OF ADJUSTMENTS: (1) SEEING THAT THE BRAKE SHOE HITS THE WHEEL RIM PROPERLY, AND (2) KEEPING SLACK OUT OF THE CABLE BETWEEN THE BRAKE LEVER AND MECHANISM, SO THAT THE LEVER TRAVELS THE SHORTEST POSSIBLE DISTANCE WHEN PUTTING ON THE BRAKES.

FIRST CHECK TO SEE THAT THE WHEEL IS TRUE BY SPINNING IT AND SEEING THAT THE RIM, NOT THE TIRE, STAYS ABOUT THE SAME DISTANCE FROM THE BRAKE SHOE ALL THE WAY AROUND.

| TABLE OF CONTENTS |
BICYCLE

BICYCLE MAINTENANCE MANUAL
BRAKES
 GENERAL
 HOW CALIPER BRAKES WORK
 LUBRICATION
 " ROUTINE ADJUSTMENTS

```
# DEFAULT            # DELETE
  TITLE               H1
  CHAPTITLE           H2
  SECTION,SECTITLE    H3
  P                   P
  ART                 A
```

Fig. 12A

```
<H1> How to Use Dyna Text </H1>
<P> Electronic Book Technologies, Inc. </P>
<H2> Introduction </H2>
<H3> Starting up the System </H3>
<P> To Start the system, type <B>dtext</B></P>
<P> After that just browse as shown here: <A
     href="ebt.com/pro/abook#EID(89)"></a></p>
```

Fig. 12B

CLIENT-SERVER COMPUTER SYSTEM FOR LARGE DOCUMENT RETRIEVAL ON NETWORKED COMPUTER SYSTEM

RELATED APPLICATION

This is a continuation of application Ser. No. 08/552,553, filed Nov. 3, 1995, now abandoned.

FIELD OF THE INVENTION

This invention is related to client-server computer systems for retrieval of electronically published documents. More particularly, this invention is related to computer document retrieval systems for large documents written using a generalized markup language.

BACKGROUND OF THE INVENTION

Electronic publication of documents, using non-paper media for transmission and storage, has become increasingly common. Electronically published documents are generally viewed by computer, and are preferably rendered or displayed on a computer screen or other output device in a formatted form. The DynaText system, a computer system available from Electronic Book Technologies of Providence, Rhode Island, is a system which is particularly useful for this purpose for very large documents.

Electronically published documents are increasingly being made available using a general markup language. A markup language provides indications of structure of the document, but excludes streams of graphic display instructions which are typically found in formatted documents. Markup languages are more portable between a variety of different machines that may use different graphic display commands. A commonly used markup language is the Standardized General Markup Language (SGML), an ISO standard.

Client-server computer systems for electronically publishing documents have also become increasingly available. Such a system typically includes one computer system (the server) on which documents are stored so that other computer systems (the clients) can access the information. The server and client communicate via messages conforming to a communication protocol sent over a communication channel such as a computer network. The server responds to messages from clients and processes requests to transmit a requested document.

An example of a client-server computer system for retrieval of electronically published documents that use a markup language is the World Wide Web (WWW) on the Internet. The WWW is a "web" of interconnected documents that are located in various sites on the Internet. The WWW is also described in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by T. Berners-Lee, et al., *in Electronic Networking: Research, Applications and Policy*, Vol. 1, No. 2, Meckler, Westport, Conn., Spring 1992.

Documents that are published on the WWW are written in the Hypertext Markup Language (HTML), such as described in *Hypertext Markup Language Specification*—2.01 by T. Berners-Lee and D. Connolly, Internet Draft Document, Oct. 14, 1994, and in "World Wide Web & HTML," by Douglas C. McArthur, in *Dr. Dobbs Journal, December* 1994, pp. 18–20, 22, 24, 26 and 86. HTML documents stored as such are generally static, that is, the contents do not change over time unless the publisher modifies the document.

HTML is a markup language used for writing hypertext documents. HTML documents are SGML documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

Each document available on the WWW has an identifier called a Uniform Resource Identifier (URI). These identifiers are described in more detail in *Universal Resource Identifiers for the World Wide Web*, T. Berners-Lee, submitted as an Internet Request for Comments (RFC), as yet unnumbered. A URI allows any object on the Internet to be referred to by name or address, such as in a hypertext link in an HTML document. There are two types of URIs: a Universal Resource Name (URN) and a Uniform Resource Locator (URL). A URN references an object by name within a given name space. The Internet community has not yet defined the syntax of URNS. A URL references an object by defining an access algorithm using network protocols. An example URL is "http://www.ebt.com" A URL has the syntax "scheme://host:port/path?selector" where "scheme" identifies the access protocol (such as HTTP, FTP or GOPHER); "host" is the Internet domain name of the machine that supports the protocol; "port" is an optional the transfer control protocol (TCP) port number of the appropriate server (if different from the default); "path" is an identification of the object; and "selector" contains optional parameters.

An Internet site electronically publishes documents on the WWW documents is called a "Web site" and runs a "Web server," which is a computer program that allows a computer on the network to make documents available via the WWW. The documents are often hypertext documents in the HTML language, but may be other types of documents. Several Web server software packages exist that provide information on the Web, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc 11 workstation running the Unix operating system, and personal computers with the Intel Pentium processor running the Microsoft MS-DOS operating system and the Microsoft Windows operating environment. The Web server also has a standard interface for running external programs, called the Common Gateway Interface (CGI). A gateway is a program that handles incoming information requests and returns the appropriate document or generates a document dynamically. For example, a gateway might receive queries, look up the answer in an SQL database, and translate the response into a page of HTML so that the server can send the result to the client. A gateway program may be written in a language such as "C" or in a scripting language such as Practical Extraction and Report Language (Perl) or Tcl or one of the Unix operating system shell languages. Perl is described in more detail in *Programming Perl*. by Larry Wall and Randal L. Schwartz, O'Reilly & Associates, Inc., Sebastopol, Calif., USA, 1992. The CGI standard specifies how the script or application receives input and parameters, and specifies how any output should be formatted and returned to the server.

A user (typically using a machine other than the machine used by the Web server) accesses documents published on the WWW runs a client program called a "Web browser." The Web browser allows the user to retrieve and display documents from Web servers. Some of the popular Web browser programs are: the Navigator browser from NetScape Communications, Corp., of Mountain View, Calif.; the Mosaic browser from the National Center for Supercomputing Applications (NCSA); the WinWeb browser, from Microelectronics and Computer Technology Corp. of Austin, Tex.; and the InternetWorks browser, from BookLink Technology, of Needham, Mass. Browsers exist for many platforms, including personal computers with the Intel Pentium processor running the Microsoft MS-DOS operating system and the Microsoft Windows environment, and Apple Macintosh personal computers.

The Web server and the Web browser communicate using the Hypertext Transfer Protocol (HTTP) message protocol and the underlying TCP/IP data transport protocol of the Internet. HTTP is described in *Hypertext Transfer Protocol—HTTP*/1.0 by T. Berners-Lee, R. T. Fielding, H. Frystyk Nielsen, Internet Draft Document, Dec. 19, 1994, and is currently in the standardization process. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. For instance, to retrieve a static document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, a user may fill in a form requesting a database search, the Web browser will send an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

At present, interaction between Web browsers and Web servers has a number of drawbacks. First, when a document is retrieved from a server by a client, the client must load the entire document into the client's memory. There is no protocol for accessing only a portion of a document. To provide acceptable performance, publishers are forced to maintain a large document as a collection of small document fragments, typically less than ten printed pages equivalent in length.

Another drawback is that Web browsers and servers generally do not support navigation tools to enhance reader navigation of a document once received by the client. Generally navigation is limited to scrolling, string searches, and links within a document. There generally is no table of contents or index that takes advantage of a document structure unless it is manually created and maintained by the publisher as a separate document.

Another restriction is that the destination of a link must always be an entire document file identified by its URL. There is no protocol for linking to targets that are inside of a document. All hyperlinks are required to behave in the same way and publishers can only use one type of hypertext link. Since URLs point to entire documents, the protocol requires transfer of an entire document when requested. The use of whole documents in the current implementation of the World Wide Web requires end users to wade through irrelevant information after invoking a hyperlink unless publishers commit to managing reusable information in many little files.

Using HTML for electronic publishing has additional problems. For example, if an application-specific SGML DTD is used by a publisher, the content must be down-converted to conform to the HTML document type before it can be retrieved via a Web browser. Potentially useful information, attributes and structure may be lost during conversion from SGML to HTML, because HTML tags are very limited, providing on rudimentary document elements and a fixed set of distinctions inadequate for effective information retrieval. There is also no direct support for SGML tables, or SGMLTeX equations in HTML. As a result of the limitations of HTML, optimization of information retrieval capabilities using document structure are lost.

Web browsers also do not typically provide much control over the style or format to be applied to document elements. The same document is generally viewed in the same way every time, with variations depending only on the size of the window on the computer screen which they are viewed. Sophisticated view controls that show information selectively (e.g., based on an access authorization code for security) are not available. Additionally, publishers cannot support similar documents that have multiple views of a single deliverable. Instead, WWW publishers must either annotate the exceptions in a single document or clone the shared content in multiple files. The end result is that either the end user is presented with irrelevant information or publishers must perform redundant maintenance.

Yet another problem with the Web browsers is that they have no collection-level or SGML-aware full-text searching. The only way to find out about a document is to know its URL in advance. Once inside a document only rudimentary string search operations are supported, and there is no full-text index. A few Web servers support full-text search across documents via WAIS, which is not SGML-aware. However, WAIS cannot communicate with Web browsers directly. Thus, it can be difficult for a user to find relevant information because browsers generally a) have no full-text search across large collections of documents, b) have no support for Boolean expressions or proximity searches, and c) are more difficult for users to find relevant information because they cannot use the SGML structure to narrow the scope of a search using SGML attributes.

Finally, there is little data anywhere but on the World Wide Web which conforms to the HTML document-type definition. Most of this existing HTML data does not pass any SGML parser and is difficult to reuse. Also, a number of client systems, also known as Web browsers, are providing their own enhanced versions of HTML which results, or may result, in incompatibility among the different types of systems. At present, server systems do not include the processing capability to be client-aware, and thus require that multiple versions of documents be made available to accommodate for different client systems.

These and other problems need to be overcome before the WWW or similar client-server system can be used to make very large documents available to many people over a heterogenous computer network.

SUMMARY OF THE INVENTION

In the present invention, the client-server system improves over the prior art by providing the ability to reference an element within a document on the server. Improvements are also provided by using a mapping table to map elements in a first markup language, e.g., SGML, in one document into markup elements in another markup language, e.g., HTML. Additionally, customizable and client-aware formatting features may be provided in this down-conversion process. A mechanism to generate references to elements within a document, such as a full-text search engine, table of contents or concordance, may also be provided.

The document server system that handles documents written using a general markup language, such as SGML, down-converts documents into another markup language, such as HTML, using the mapping table. Any client system that processes the other markup language can then be used to view the down-converted documents. A client system can request an element with a document, as well, and the server system can down-convert only that portion of the document for transmission to the client. The reference to the element within the document includes a document locator, which is a reference to the document on the server, such as a URL, and an element locator, which indicates an element within referenced document. Such a system takes advantage of the generality and rich contextual information provided by a general markup language which improves portability, the ability to interact with many client systems in a heterogenous computer system and simplifies the electronic publishing process by reducing storage of redundant information. Tables of contents, full-text indexing and other navigational tools can be provided automatically and dynamically without requiring the generation of separately published documents with such information.

In one embodiment of this invention on the WWW, the system provides a mechanism whereby very large SGML documents can be easily viewed by a client system by sending only a portion of the document, such as a chapter or section. In this embodiment, a document locator is a URL used in the WWW which is provided with an additional field, defined by a delimiter character followed by a unique element identifier which identifies an element within the referenced document by a number. Standard methods used for identifying an element within a document, such as those defined by the Text Encoding Initiative (TEI) may also be used. Such URLs can be generated at the time of construction of the element identifiers for cross-references within a document, at the time of a full-text index, or the time of generation of a table of contents.

In an embodiment of the invention using SGML documents, down-conversion of an SGML document fragment can be performed in a manner similar to formatting of the SGML document fragment by using a mapping table for the corresponding document type definition which maps SGML elements to elements of the other markup language. The mapping table can be readily implemented as a style sheet, commonly used for specifying formatting properties for SGML documents. The use of a mapping table, particularly using style sheets, can also provide for a variety of customizing features, including automatic insertion of copyright notices, or other text before and after the document fragment. Conditional formatting, including client-aware formatting, can also be performed.

Another aspect of the invention is the provision of a mechanism which transmits two frames of information to a client, for those client programs which can provide for multiple views. For example, a table of contents and full-text search results can be sent to the client which can then display them in two separate display areas.

BRIEF DESCRIPTION OF THE DRAWING

In the drawing,

FIG. 4 is an illustration of a sample document with descriptive markup;

FIG. 6 is an illustration of an element directory with example values corresponding to the document of FIGS. 4 and 5;

FIG. 7 is an illustration of a fully-qualified name table with example values corresponding to the document of FIG. 4;

FIGS. 9–11 are example display views produced for tables of contents, full-text searches and document fragments;

FIG. 12A shows a sample DTD mapping table;

FIG. 12B shows a sample HTML document which results from the DTD mapping table of FIG. 12A and the SGML sample document of FIG. 4;

DETAILED DESCRIPTION

The present invention will be more completely understood through the following detailed description which should be read in conjunction with the attached drawing in which similar reference numbers indicate similar structures.

The present invention provides a document retrieval system for electronically published documents, particularly those written using a general markup language. A markup language consists of tags which are used to prepare a structured document. One commonly-used markup language is the standardized general markup language (SGML) which is International for Standards Organization (ISO) standard 8879-1986. SGML is preferred because there are well defined forms of such documents. Thus, parsing of SGML documents is easier. Other markup languages include LaTex and Scribe.

A preferred embodiment of the invention handles documents written using SGML. Such documents can be processed to improve searching and retrieval time of document portions. Such processing is described in U.S. patent application Ser. No. 07/733,204, filed Jul. 19, 1991, which is hereby incorporated by reference.

The system described in the U.S. patent application Ser. No. 07/733,204 can be modified in accordance with the teachings herein to act as a server which provides electronically published documents to client viewer systems which receive and process documents in a markup language. Such a server would be useful as a Web server on the WWW to down-convert SGML documents to HTML documents, as will now be described.

Figure 1:
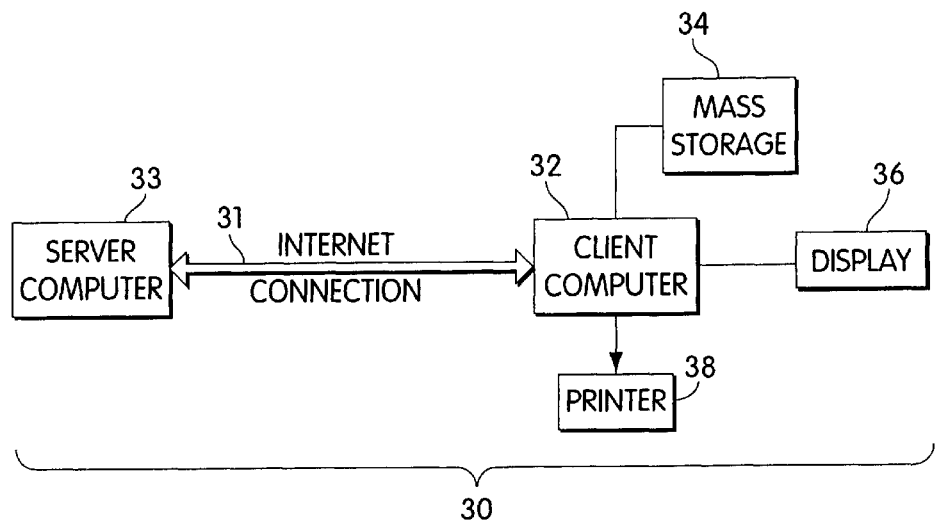
FIG. 1 is an illustration of a data processing system in which the present invention may be utilized.

A data processing system 30 suitable for implementing the present invention will now be described in connection with FIG. 1. The data processing system 30 includes a client computer 32 which has a mass storage device 34, such as a disk drive. The mass storage device 34 may be internal (not shown) or external (as shown) to the client computer 32. The data processing system 30 also includes an output device such as a monitor, or graphic display 36 and, optionally, printer 38. The client computer 32, combined with display 36, is preferably programmed to enable multiple simultaneous views, popularly known as "windows", which facilitate providing the user with access to multiple processes. One of these processes may be a client program such as a Web browser.

The client computer 32 is connected to a server computer 33 via an interconnection 31. The interconnection 31 may be permanent or temporary, and can be any form of computer network such as the Internet, private LAN, modem connection, etc. The server computer is configured to run a server program, such as a Web server, in accordance with the present invention. The client computer 32 can be running any of a number of client programs, such as a Web browser.

Figure 2:
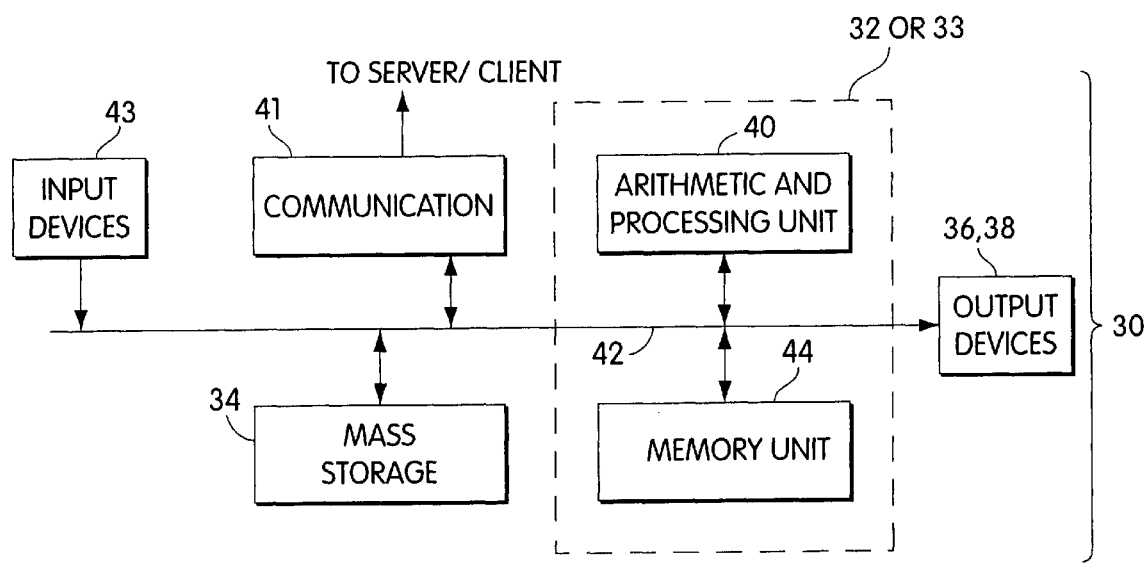
FIG. 2 is a block diagram of the data processing system of FIG. 1.

FIG. 2 shows further detail of the structure of either the client or server computers. Computer 32 or computer 33 includes a processing and arithmetic unit 40 and a memory unit 42 connected to the processing unit via an interconnection mechanism 44 such as a bus. Mass storage 34 is also connected to the memory unit and processing unit via the interconnection mechanism 44 along with the output devices 36 and 38. Input devices 43, such as a keyboard, mouse, tablet, trackball and other device may be provided. A communication connection 11, such as a modem or network interface card, is also provided to make the connection to the client or server.

The data processing system 30 is configured to be a machine or to perform a process in accordance with the present invention using a computer programming language, such as the "C++" programming language. It should be apparent to those skilled in the art that the present invention is not limited to a specific programming language or a specific general purpose data processing system and that other appropriate programming languages and other appropriate general purpose data processing systems could also be used.

Figure 3:
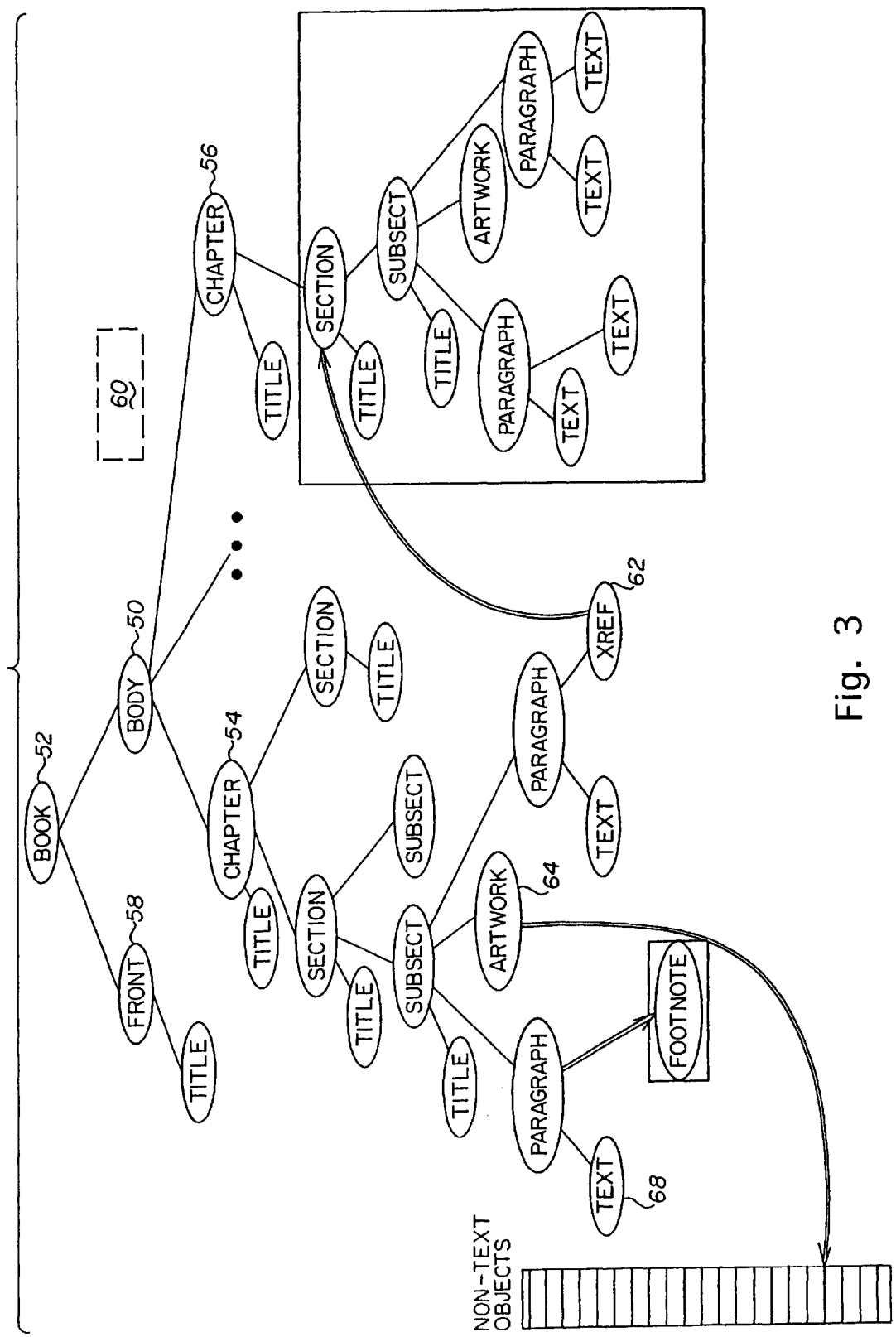
FIG. 3 is a diagrammatic illustration of the hierarchical structure of an example document with which the present invention may be used.

The present invention handles structured documents in electronic form and include text content, descriptive markup and possibly non-text content. The present invention is particularly useful with large electronic documents, of which typical examples are electronic books such as operation manuals for large systems, such as computer systems, airplanes and ships. The descriptive markup of an input document is interpretable as an ordered hierarchy of content objects, such as illustrated in FIG. 3. That is, the descriptive markup defines a structure including a set of elements which, when taken together, form a tree or similar hierarchical object. A markup element describes the function or meaning, rather than the appearance, of the text which it includes. Elements representing only appearance or format characteristics may be used, but are non-optimal.

In such a document, an element, e.g. element 50 of FIG. 3, may have a parent element (52), a first child element (54), a last child element (56), a left sibling element (58), and a right sibling element (60). In the example just described, a right sibling of element 50 does not exist in the document, and is therefore defined by "nil", or some non-element identifier. Similarly, if an element does not have first or last children elements, a left sibling element, or a parent element, the corresponding values are also defined to be 'nil' or some other non-element identifier. The text content elements 68 of a document are normally found as the leaves of a tree.

A document may also include other types of elements which do not describe function, meaning or appearance of the text. These types of elements include cross-referencing elements 62 which may be used to link relevant sections of a document or even separate documents. Artwork elements 64 may be used to point to non-text objects, such as graphic raster files, which also may be separate electronic documents.

An example of a descriptive markup language for electronic documents is specified by ISO standard 8879: Standard Generalized Markup Language, or, "SGML". This standard is described in "Information Processing—Text and Office Systems—Standard Generalized Markup Language (SGML)," by the International Organization for Standardization, ISO 8879-1986(E), which is hereby incorporated by reference. Documents in SGML may be created using standard text editors, such as SoftQuad Author/Editor, which is commercially available from SoftQuad, Inc., of Toronto, Ontario, Canada. The "Scribe" and "LaTeX" word processing language is a similar document markup language. Other suitable markup languages may also be used.

The preferred embodiment of the present invention processes documents which comply with the SGML standard. Such documents are preferred because of the acceptance of the standard by publishers and government agencies. SGML-compliant documents may be made from other types of documents using commercially available systems. A simple exemplary SGML compliant document is provided in FIG. 4. This example is used to illustrate the process and data structures of the present invention and is not limiting, as the system of the present invention may be used readily with arbitrarily large documents.

An SGML document includes markup tags which may be described as start tags, end tags, or empty tags. An empty tag may be understood as being both a start tag and an end tag. In this sample document of FIG. 4, start tag 45 begins a markup element. An end tag, such as end tag 47, ends the corresponding markup element. Thus start and end tags define a markup element. Elements having start and end tags occurring between the start and end tags of another element (as tags 46 and 48 are between tags 45 and 47) are defined to be children, descendants, or lower elements of the tree. The containing markup element is called a parent or ancestor element. Children at the same level beneath a parent are siblings.

Some of the tags in the descriptive markup of the document may also be empty tags such as tag 49 (FIG. 4). Such empty tags may be used for cross-referencing, referencing other documents, or for referencing graphic or other types of non-text information, etc. These tags often have attributes which are variables, such as "file", to which are assigned values, such as "myfig12". These attributes may be interpreted when the document is rendered to retrieve graphics files, etc. Normal start tags 45 may also include attributes which are often useful for marking text which is to be hidden for security or other reasons, or for attaching a unique identifier for an element for cross-referencing or other uses. For example, when a document is rendered, an attribute for a start tag may be examined, and if the attribute has a predetermined value, display of that material may be prevented or modified, thus providing security for a document.

Figure 5:
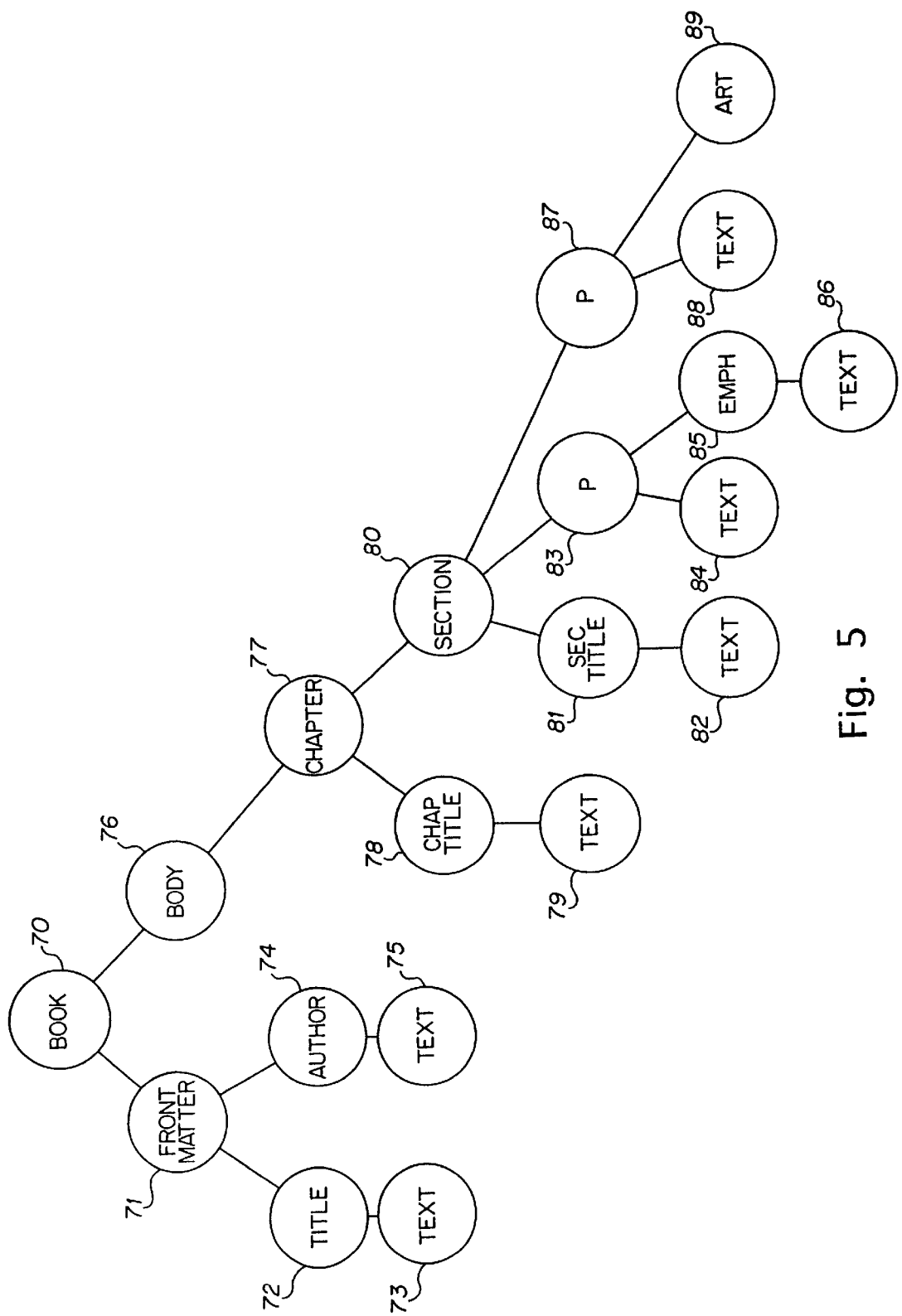
FIG. 5 is a diagrammatic illustration of the hierarchical structure of the sample document of FIG. 4.

FIG. 5 is a representation of the tree structure generated from the sample SGML document of FIG. 4. The process of generating this representation is described in U.S. patent application Ser. No. 07/722,204. Reference numbers 70–89 have been assigned to the elements defined by the markup structure of the SGML document. It is preferable to assign sequential numbers, or element identifiers, to each element appearing in the document according to the order of appearance of these elements in the document. These element identifiers are used in the generation of the document representation of the present invention, the element directory 91 (FIG. 6), which is used to improve navigation of the document.

The data structure of FIG. 6, the element directory 91, is an array of element descriptors 90. Each element descriptor 90 represents an element of the document. In the preferred embodiment, an element descriptor 90 is easily retrieved from the array on the basis of the element identifier which is assigned to its corresponding element. The element descriptor 90 includes a field 92 for representing the parent of the element, a field 94 for representing the first child, a field 96 for representing the last child, a field 98 for representing a left sibling, a field 100 for representing a right sibling, a field 102 for representing the type of the element, and a field 104 for representing the location of text characters for a text chunk or the location of other data associated with the element such as attributes. Typically, a separate document is maintained in which all text context is stored. Field 104 may be pointer to a location in this document. Alternatively it may be an offset and length in the original SGML document. Those fields which represent elements, such as parent, child and sibling elements, preferably contain the element identifiers assigned to those elements.

The above-described representation of an element descriptor may be further optimized for documents which are not modified after its element directory is generated. In this case, the element identifier of a first child of an element is always the immediately succeeding element identifier of that element. Thus, this field may be reduced to a one-bit representation, e.g. '1' may indicate that there is a first child and '0' that there are no children.

Another variation for the element directory 91 may include element descriptors 90 of variable size. Since a descriptor 90 may have a few NIL values, the size of the corresponding fields may be reduced. An element descriptor 90 may then be accessed from a file according to the offset or location in the file and length of the descriptor 90. Element identifiers assigned to element descriptors may be mapped to the values of the offset and length of their corresponding element descriptors. Such a modification may reduce the size of the element directors 91, but increases the time it takes to access an element descriptor.

In the example of FIG. 6, element descriptor 90 corresponds to element 70 of FIG. 5. Since element 70 does not have a parent element, parent field 92 includes a non-element value. Similarly, left and right sibling fields 98 and 100 also include non-element values. Field 102 includes a representation that element 70 is of the type, "book".

It is preferable that the size of element type field 102 remain constant across all element descriptors. In the preferred embodiment of the present invention the element type in field 102 is represented by a pointer to another data structure, or data file, called the fully-qualified name table. The fully-qualified name table is a list of element types encountered in the document. The pointer includes a representation of the offset, or location, of the element type in the fully-qualified name table and possibly the length of the type name.

A preferred embodiment of a fully-qualified name table is represented as a compressed list in FIG. 7. The list is compressed by representing as many sequential types as possible in a compressed form. That is, rather than having a list of:

"BOOK"
"BOOK, FRONTMATTER"

The list is compressed to "BOOK, FRONTMATTER". Thus, repeated occurrences of a type name may be eliminated. The table of FIG. 7 corresponds to the example document represented by FIGS. 4–6 and is to be understood as a stream of characters. Thus, as an example, field 102 for element 70 (of type "BOOK") would show an offset of 0 and a length of 4, since the first occurrence of "BOOK" is at the beginning of the table and has a length of four characters. Similarly, the entry for field 102 for element 76, i.e. the element whose parent is 70 and first child is 77, would have an offset of 47 and a length of 9, since the first occurrence of "BOOK, BODY" occurs at the 47th character in the table and is 9 characters long. Likewise, element 71 ("BOOK, FRONTMATTER") has an offset of 0 and a length of 16. Various other methods of representing a fully-qualified name for the element may be used, such as a list of fully-qualified names retrieved according to their placement in the list. However, the preferred embodiment should reduce the size of this table sufficiently to allow the fully-qualified name table to be loaded into RAM.

Creation of the full text index of the document will now be described in connection with FIG. 8. Full text indexers which find and report the number of occurrences of selected words in a document have been known for some time. Such an indexer would determine, for example, that in the sample document of FIG. 4, the word "starting" occurs once, and the word "system" occurs twice. However, such systems normally identify only the total number of occurrences of a word in a document or in a certain level of granularity of a document, such as a paragraph. The system of the present invention, however, reports how many times the word is found in each element and sub-element of all levels of a document. The procedure for obtaining this result is called hierarchical indexing. Hierarchical indexing is described in U.S. patent application Ser. No. 07/733,204, and uses a data structure as shown in FIG. 8.

Figure 8:
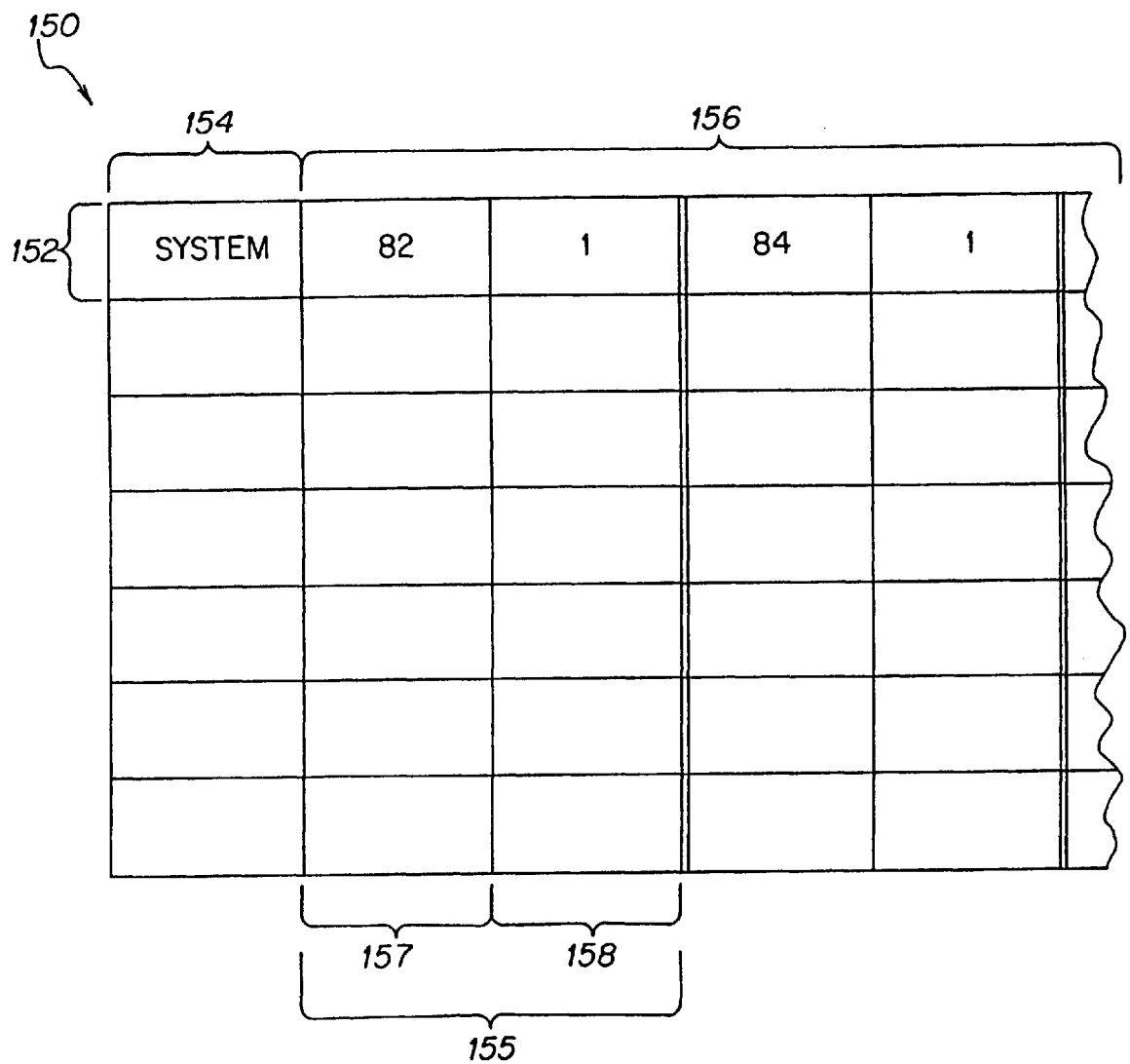
FIG. 8 is an illustration of a frequency record for full text indexing.

FIG. 8 illustrates a frequency record table 150 which includes an entry 152 for an indexed word. An entry 152 includes a field 154, which represents the word and records 156 which make an ordered list of pairs of an element identifier (field 157) of the element in which the word (field 154) occurs, and the number of appearances of that word in that element (field 158).

The frequency record 150 is slightly different in initial result for the different methods. With the first method, the resulting frequency record for a word initially includes the number of occurrences of that word for the different leaves of the tree, i.e., the text chunks. When a document is searched for a word by a user, a summation of occurrences of the word in each element of the document performed in the manner described in U.S. patent application Ser. No. 07/733,204. According to the second method, the frequency record for a word includes the number of occurrences of a given word in each element or sub-element of the document rather than only in the leaf elements. This method is normally performed as a user-independent process, before a user views the document. The procedure for this method is also described in U.S. patent application Ser. No. 07/733, 204. With both methods, the result visible to the viewer of the document is the same.

The present invention, preferably using the architecture described above, simplifies access to very large documents in a client-server system across the Internet or other computer networks by reducing the amount of information that needs to be transmitted and by improving navigational and viewing tools. One aspect of this improvement is provided by using an element locator, which indicates an element within a document, in combination with a document locator, such as a file name or URL. The element locator is a starting point from which viewing of a document can begin which eliminates the need to transmit an entire document across a computer network.

Figure 10:
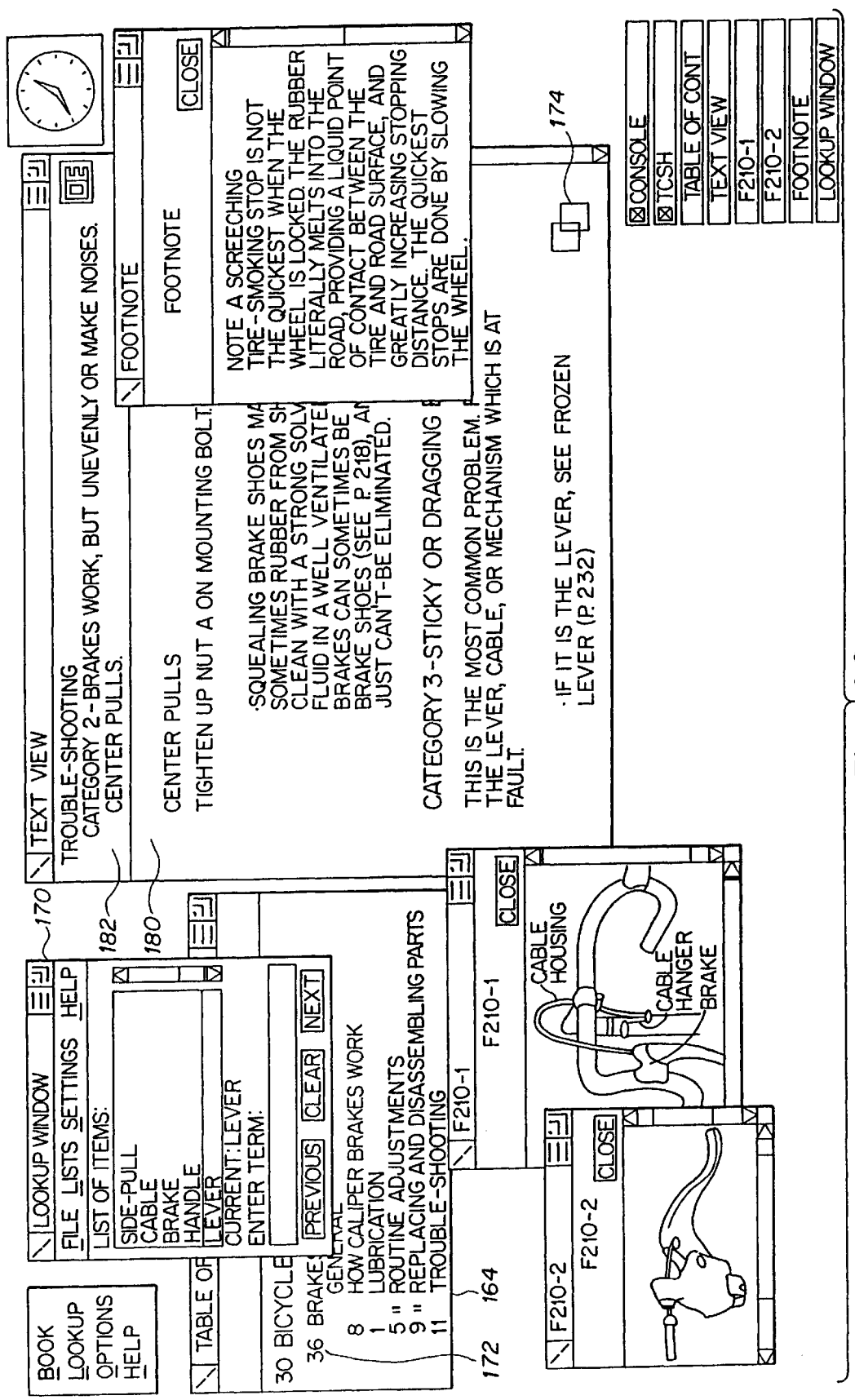

A variety of mechanisms may used for obtaining from a user a desired starting point from which rendering of a document may begin. One well-known mechanism is a table of contents from which a section of a document may be selected, such as shown in FIG. 9 and FIG. 11. A user may also have a directed path, bookmark, history log or other list of preselected starting points. A user may also perform a search for a word based on the full text index, in known ways of the type as shown in the displays of FIGS. 9–10, to begin rendering at a selected occurrence of a word. Additionally, a document, while being rendered, may cause possible cross-references to be displayed, as shown in FIGS. 10–11. These cross-references may also be used to select a starting point for rendering of the document.

A reference to an element within a document can be in many forms. Generally, this starting point is defined by a reference to the document on the server (herein called a document locator), combined with a reference to an element within the referenced document (herein called an element locator). For example, in an embodiment to be used on the WWW, a document locator may be a URL: "http://www.ebt.com/pro/abook". In a private LAN, the document may be an actual file name in the file system. An element locator may be an element identifier for the element as defined using the element directory 91, such as the number thirteen. Thus the thirteenth element of the "abook" document can be accessed using the following string: "http://www.ebt.com/pro/abook#EID(13)". An element locator may also be in any format which can be used to uniquely identify an element. Several such representations are used by the Text Encoding Initiative (TEI) or the Hytime ISO standard 10744. For example, the element locator may be identified by a numerical index representing the child number at each level of the tree along the path to the selected element. For example, the string "1-5-7-1" represents the first child of the seventh child of the fifth child of the first child of the root node. Each number in this list can also be qualified by element type so that instead of representing the "nth" child, the number may represent the "nth" chapter or section, for example. Such a representation of the element locator may also be used to traverse an element directory 91 shown in FIG. 6. Alternatively, an unparsed representation of the SGML file may be used, but would require parsing of the SGML document using the element locator to access the document fragment indicated by the element locator. Parsing of an SGML document is described in U.S. patent application Ser. No. 07/722,204 and can be modified to allow for matching an element locator.

The process of down-converting a fragment of a document in one markup language to a document in another markup language, using a document locator which includes an element locator, will now be described in connection with FIGS. 12–16. While this description is provided using HTML as the target markup language and SGML as the source markup language, it should be understood that other target and source markup languages could be used. FIG. 12B illustrates an HTML document that results from the SGML sample document shown in FIG. 4. It includes a cross reference that is an element within a document. In particular, the art element 89 as shown in FIGS. 5 and 6 is represented by a cross reference to another file accessible using the element identifier for element 89.

This process of down-conversion uses a mapping table that maps elements in the source markup language to corresponding elements in the target markup language. An example table for converting SGML to HTML is shown in FIG. 12A. In particular, the default is that an element is deleted as shown in row 200. Row 202 indicates that a <title> tag converts to an <H1> tag. A <chaptitle> tag is converted to an <H2> tag (row 204). <Section> and <sectitle> tags are converted to an <H3> tag (row 206). Finally, <P> tags (row 208) convert to <P> tags and the <art> tag converts to a cross reference tag such as <A href=" . . . "> (row 210).

Figure 13:
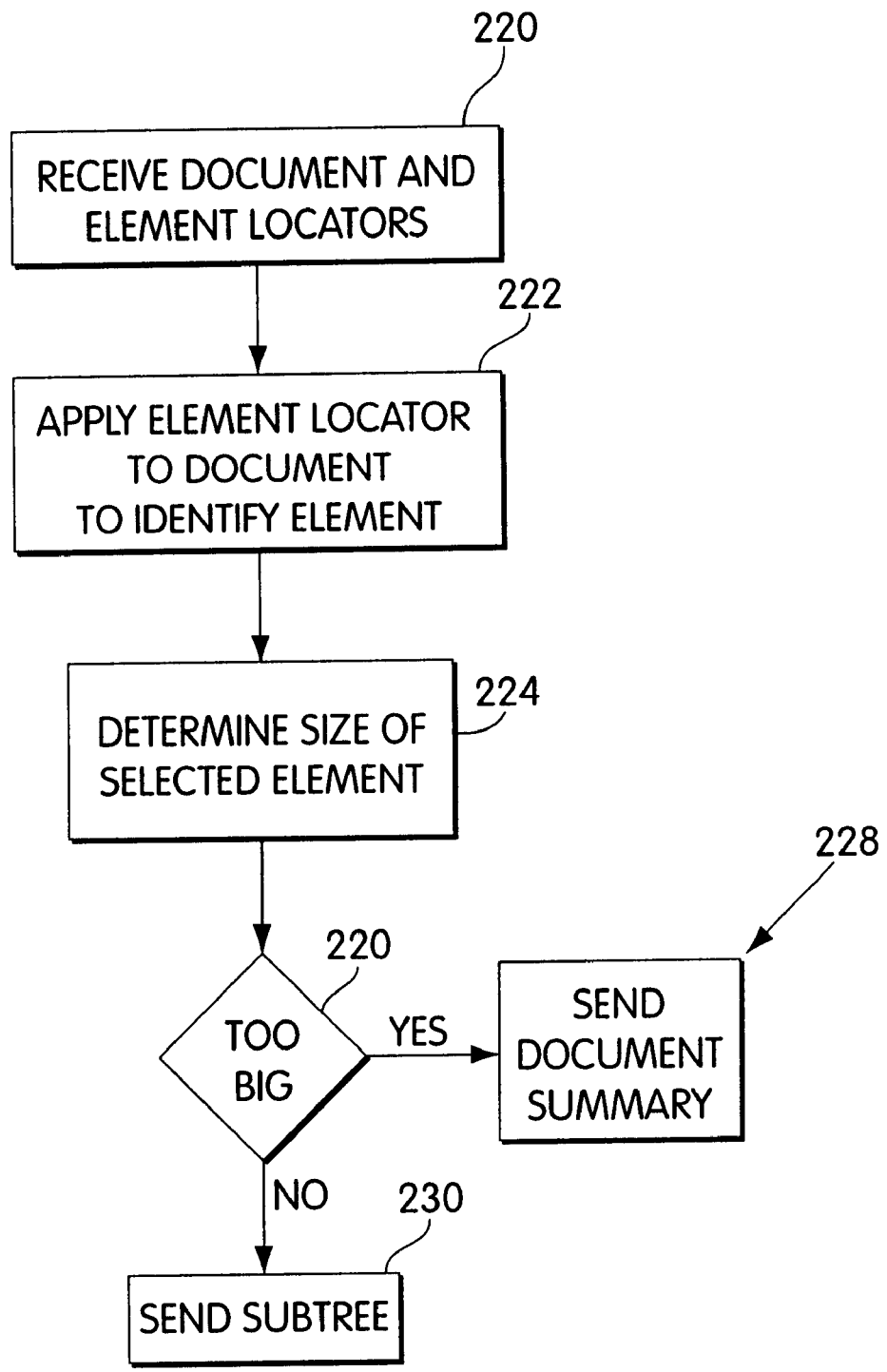
FIG. 13 is a flowchart describing how the server processes a request for a portion of a document.

Processing of a document locator and element locator to process and send a subtree of a structured document will now be described in connection with FIG. 13. The first step, performed by the server, is receiving the document and element locators, as shown in step 220. The element locator is applied to the document indicated by the document locator in step 222 to identify and access the referenced element. Using a pre-processed representation of the document, including an element directory 91 as shown in FIG. 6, this step would retrieve the entry for the given element identifier in the element directory 91. This entry contains information which then provides indicators of other elements in the document structure and the location of text and other information.

Next, the size of the selected element is determined in step 224. While this step is not necessary, it is preferable to avoid sending a document which is too large to send in an acceptable period of time. How size of a selected element is determined is described in more detail below in connection with FIG. 14.

Given the determined size of the selected element, if it is too big (as determined in step 226) a document summary, such as a table of contents, is sent in step 228 rather than the actual text of the selected element. This process is described in more detail below in connection with FIG. 16. If the determined size is not too big, the selected subtree is sent in step 230. The step of sending the selected subtree includes the down-conversion process from SGML to HTML and will be described in more detail below in connection with FIG. 15.

Figure 14:
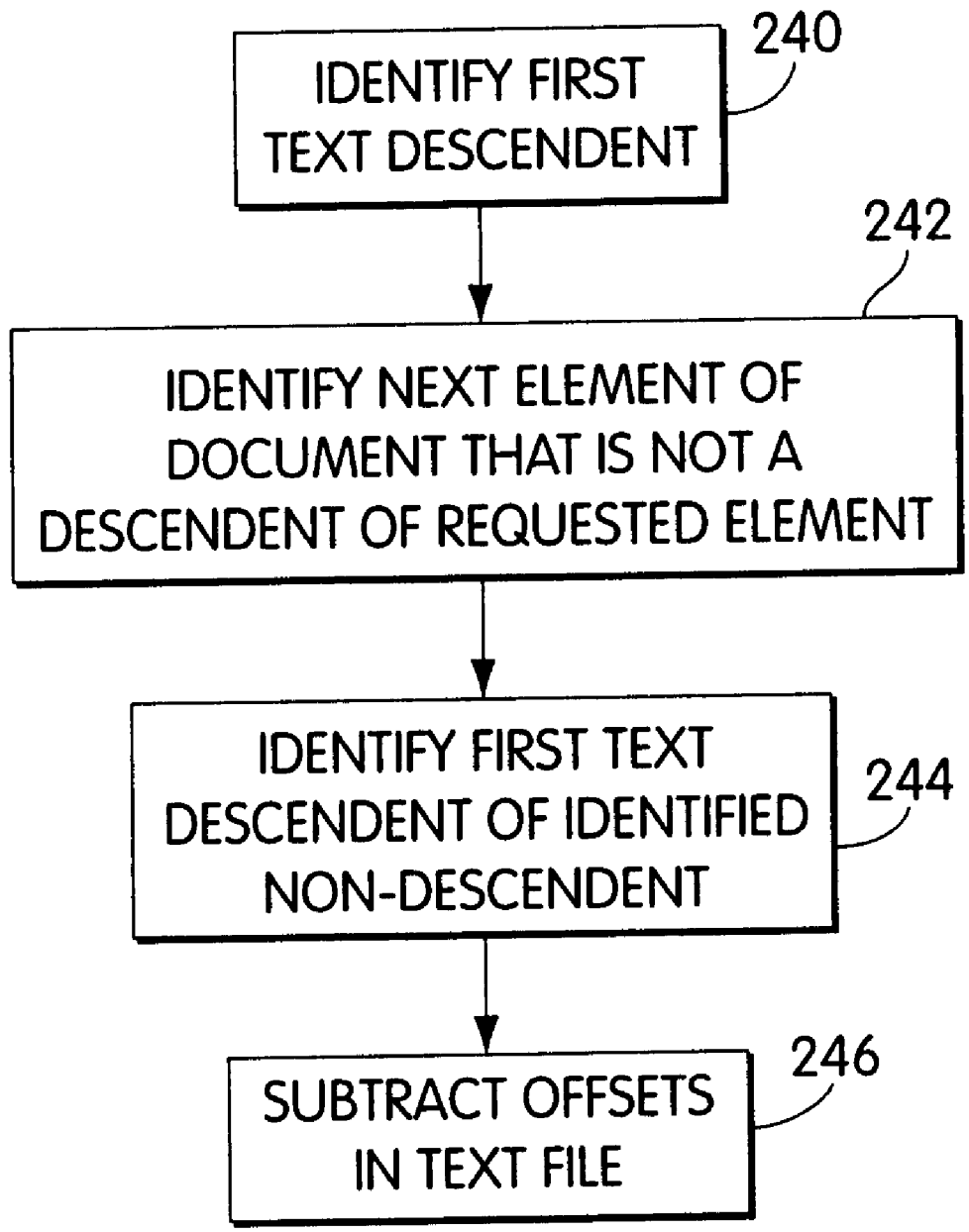
FIG. 14 is a flowchart describing how the size of a document fragment is determined.

Determination of the size of the selected element will now be described in connection with FIG. 14. There are many methods to determine the size of the selected portion of a document which generally depends on how the document is represented and parsed by the system. The following example assumes that an element directory such as shown in FIG. 6 will be used.

The first step of determining the size of a selected portion of a document involves identifying the first text descendant of the selected element, as shown in step 240. This step is performed by simply accessing the element directory 91 in a sequential manner starting with the selected element until a text element is identified. For example, if the selected element is element 71 in FIG. 5, the first text descendant would be element 73. Next, the next element of the document which is not a descendant of the selected document is identified in step 242. This element is generally the right sibling of either the selected element or the closest ancestor having a right sibling. In particular, element 76, as shown in FIG. 5, would be identified by step 242 if the selected element is element 71.

The first text descendant of the element identified in step 242 is then identified in step 244. This identification can be performed in the same manner as described above in connection with step 240. In this example, the first text descendant of element 76 is element 79.

By identification of text elements in step 240 and 244, the element directory 91 can be used to determine the location or offsets in a text file of the text content of these text elements. These offsets in the text file are provided by field 104 for the selected text elements. The offsets are subtracted to provide an estimate of the size of the selected portion of the document.

The process of sending a subtree, step 230 in FIG. 13, will now be described in more detail in connection with FIG. 15. This process is very similar to the process of rendering an SGML document using style sheets as described in U.S. patent application Ser. No. 07/733,204. The process of traversing the SGML document to identify elements and their tags and to apply corresponding style sheets is described therein. A summary of the differences between that rendering system and that of the present invention are the following. First, in the present invention header and footer information may be provided at the beginning or end of each transmitted chunk of the SGML document. Such header and footer information are typically used only for printing header and footer information on paginated printed copies of a rendered SGML document. Additionally, the rendering process in this invention results in the generation of a document in a second markup language, which is then transmitted across the network to a client system. This translation is preferably made by using style sheets, in a manner described below, to implement a mapping table. Graphic display commands and formatting properties are applied by the client system that parses the down-converted document chunk into a formatted display on the client computer screen.

Figure 15:
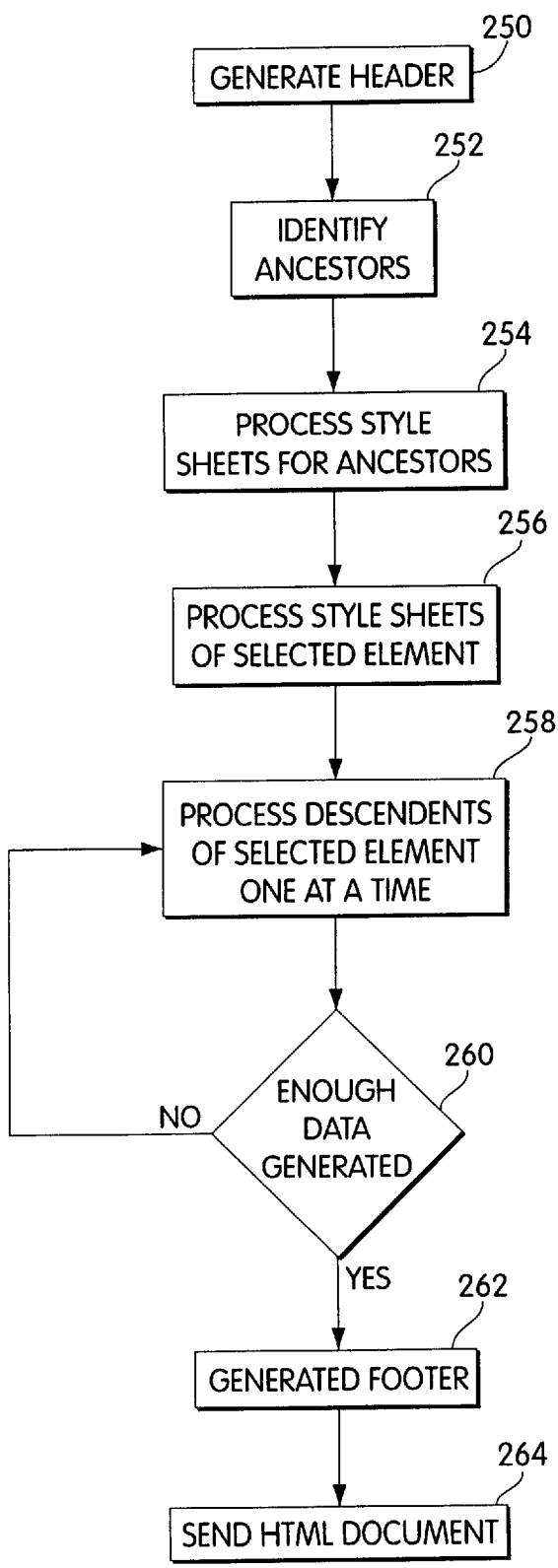
FIG. 15 is a flowchart describing how a markup document is down-converted to a document using a different markup language.

FIG. 15 illustrates the steps taken by the server to down-convert an SGML document fragment to generate an HTML document. While the following description uses SGML and HTML as example source and target markup languages, it should be understood that other markup languages may be used. The down-conversion process begins, optionally and in one aspect of the present invention, with step 250 of generating header information. The header information is defined by a style sheet for the given document type definition for the selected SGML document. Such a style sheet typically has the attributes <text-before>, <text-after> and <hide>. If the <hide> attribute is false, the header is displayed. Particular style sheets will be described in more detail below.

The header can be generated using either <text-before> or <text-after> fields. This feature is particularly useful for generating copyright notices on the fly for arbitrary fragments of the SGML document to be transmitted. Thus, these notices do not have to be prepared in advance for particular selected document fragments and allows for a dynamic selection of fragments. The header information may also be used for a variety of customizations, particularly "button bars", other graphical images or text that are linked to commands or other portions of a document on the World Wide Web.

Steps 252 through 260 generally describe the same steps used to render a document as described in U.S. patent application Ser. No. 07/733,204. The difference in this invention arises in the use of the style sheet which implements the document type definition mapping table. By use of the style sheets to implement this mapping table, SGML documents can be readily down-converted to HTML documents.

More particularly, a portion of a document beginning with a selected element is processed by first identifying its ancestors in step 252. This is readily done using the element directory 91 discussed above. The style definitions for these ancestor elements are then processed in step 254. Generally, the ancestors are first identified and their identification is pushed onto a stack in an upward traversal of the tree structure of the document. The style definitions are processed by pushing conversion information onto a stack while popping ancestor information off another stack until the selected element is finally reached. When the selected element has reached its style sheet it is processed in step 256. Descendants of the selected elements are then processed one at a time through steps 258 and 260 until enough data has been processed, as determined by step 260. A simple way to determine whether enough data has been generated is by merely setting a threshold on the amount of data in the resulting HTML document.

After completion of steps 258 and 260, in one aspect of this invention a footer is generated in step 262. The footer is customizable just like the header as described above in connection with step 250. Step 262 completes the generation of the HTML document which then can be sent to the client system in step 264.

The use of style sheets to act as a mapping table to provide a variety of functions will now be described. The document type definition mapping table is implemented as an SGML style sheet. In particular, for each type of element tag in the document type definition for the SGML document and for the header and footer, there is a style definition in the following form:

<style Name=tagtype>
        <text-before> . . . </text-before>
        <text-after> . . . </text-after>
        <hide> . . . </hide>
    </style>

While the style sheets may include numerous properties, the ones primarily used for a mapping table are the <text-before>, <text-after>, and <hide> attributes. The <hide> attribute is used to delete elements of which the content is not sent or down-converted. For example, some information found in an SGML document, such as the front matter or information requiring security access, can be prevented from being sent. The <hide> attribute is true when the element should not be sent and is false otherwise. Conditional operations may be provided for the <hide> attribute for security functions.

The <text-before> and <text-after> attributes are used to generate the HTML tags corresponding to the element tag for which the style definition is being made. There is a great amount of flexibility in defining the content of the <text-before> and <text-after> tags, including conditional, logical and arithmetic operations to be performed. A powerful variety of features can be provided using such a style sheet.

In the simplest example, a paragraph element tag <P> in SGML can be mapped to a "<P>" in HTML by defining the following style sheet:

```
<style Name=P>
   <text-before> "<P>" </text-before>
   <text-after> "</P>" </text-after>
   <hide> false </hide>
</style>
```

More complicated HTML tags can be generated. For example, if the element tag in SGML is a warning tag <warn>, the following style sheet could be used:

```
<style Name=warn>
   <text-before> "<P type=C> warning</P><P>"
   </text-before>
   <text-after> "</P>" </text-after>
   <hide> false </hide>
</style>
```

Cross-references within the SGML document can be generated using a style sheet, for example, one in the following form:

```
<style Name=art>
   <text-before>  <A  href=http://www.ebt.com/pro/
      abook#EID(;
      first-child(current-ID);> </text-before>
   <text-after> "</A>" </text-after>
   <hide> false </hide>
</style>
```

Tags which have no corresponding tag in the target markup language are translated by having a null string for <text-before> and <text-after> attributes, and the <hide> attribute set to false.

Even more interesting document conversions can be made using conditional or other types of operations in the style sheets. For example, because the standard used by the World Wide Web requires an indication of the identity of the client in any message sent from the client to the server, a conditional operation can be performed according to the identity of the client. Thus, particular features available in some client systems and not in others can be by the server if the presence of that client is detected. This capability eliminates the requirement of current systems that different documents be maintained for different browser types. For example, the following style sheet could be used:

```
<style Name=announce>
   <text-before> if client-type=Netscape then
      "<new-feature-tag>" else
      "<common-feature-tag>" </text-before>
   <text-after> . . . </text-after>
   <hide> false </hide>
</style>
```

The conditional operation can also be performed on the element type being transmitted. The following Header style sheet provides and example:

```
<style Name=Header>
   <text-before> if element-type=chap then
      "<P> This Chapter Copyright 1995 </P>" else
      "<P> This Section Copyright 1995 </P>" </text-before>
   <text-after> " " </text-after>
   <hide> false </hide>
</style>
```

Additionally, this kind of conditional branching based on the type of element selected or on the type of client detected can be used as a preprocessing or postprocessing step in the process shown, for example, in FIG. 15. For example, if a particular client is detected that can handle display of two related documents in separate windows or window portions, the process of FIG. 15 could be modified to send, first, a brief table of contents of the document, followed by any necessary delimiter, then by the processed document fragment. Manipulating such delimiters may also be useful in sending both table of contents and full-text searching results for display by the client into separate window portions.

Figure 16:
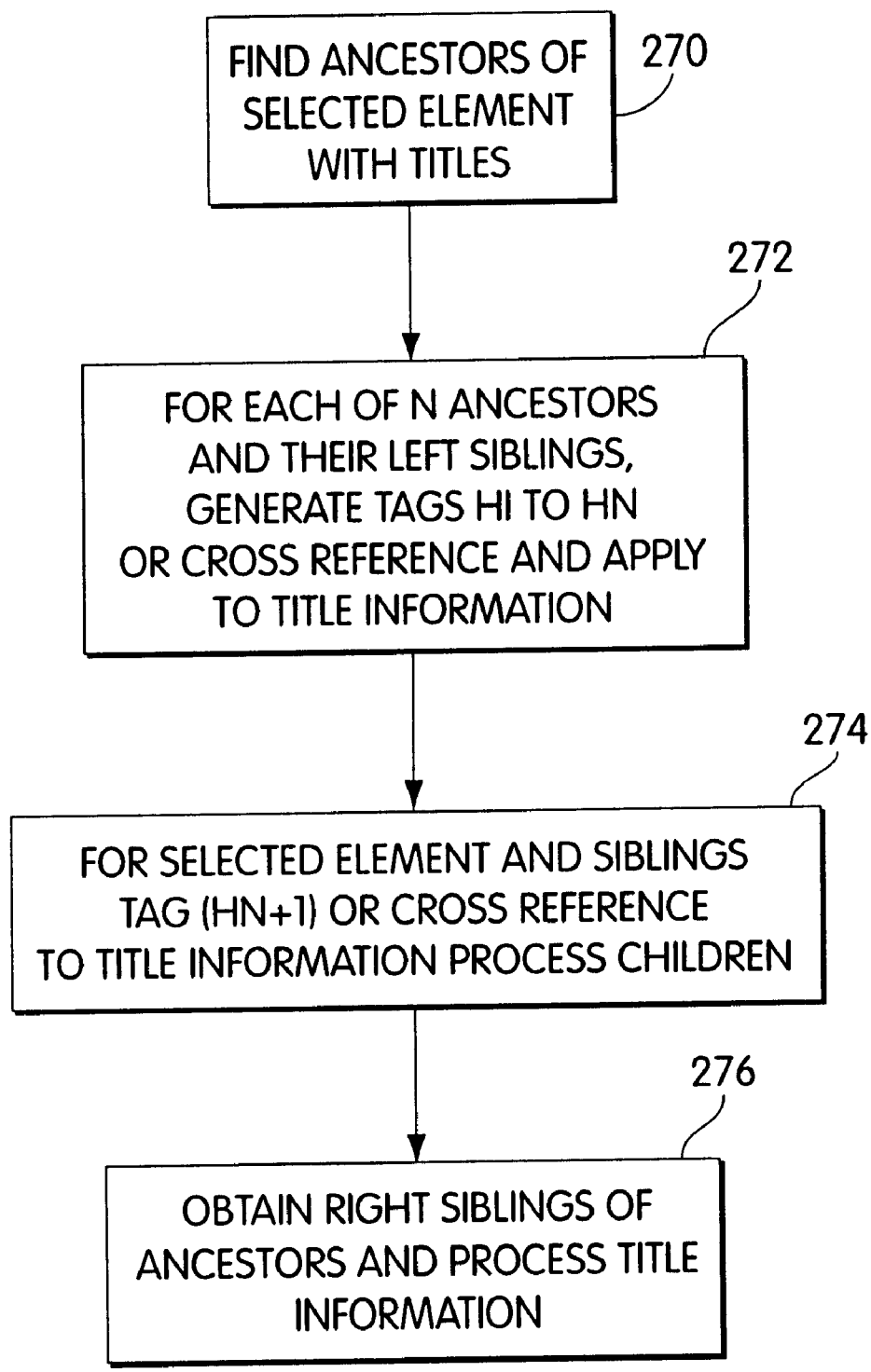
FIG. 16 is a flowchart describing how a table of contents is generated.
Figure 17:
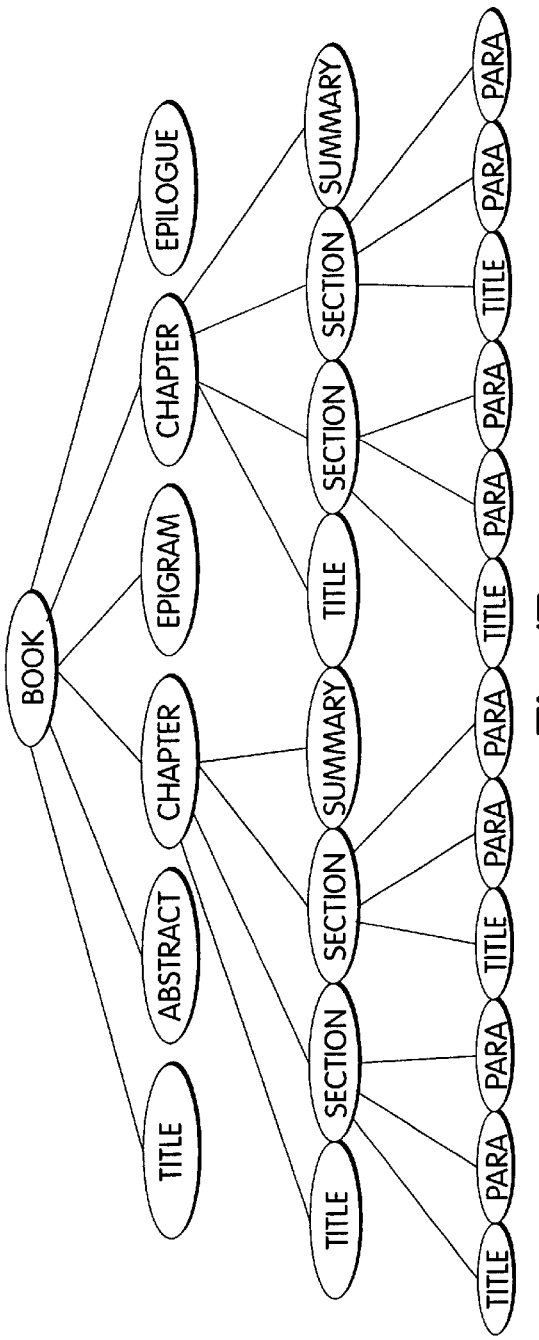
Figure 18:
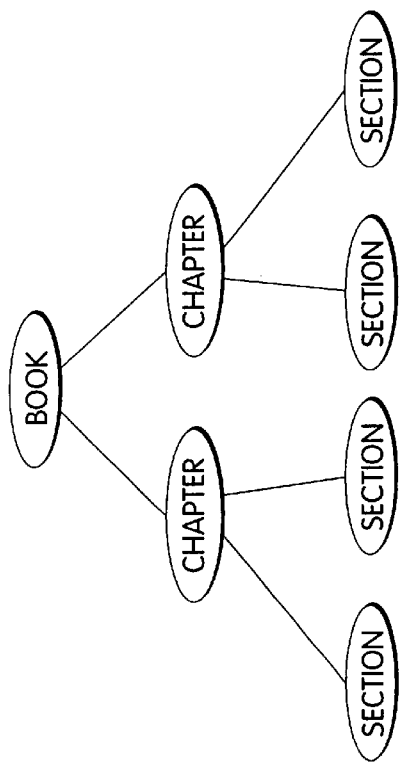
Figure 19:
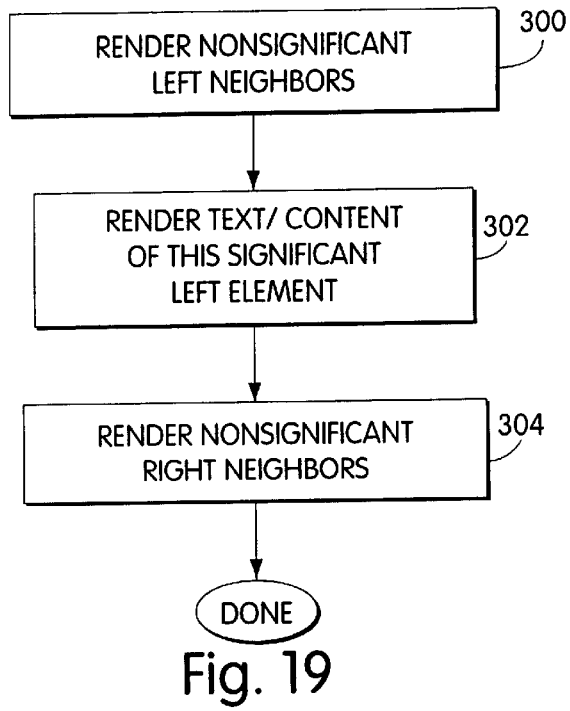
Figure 20:
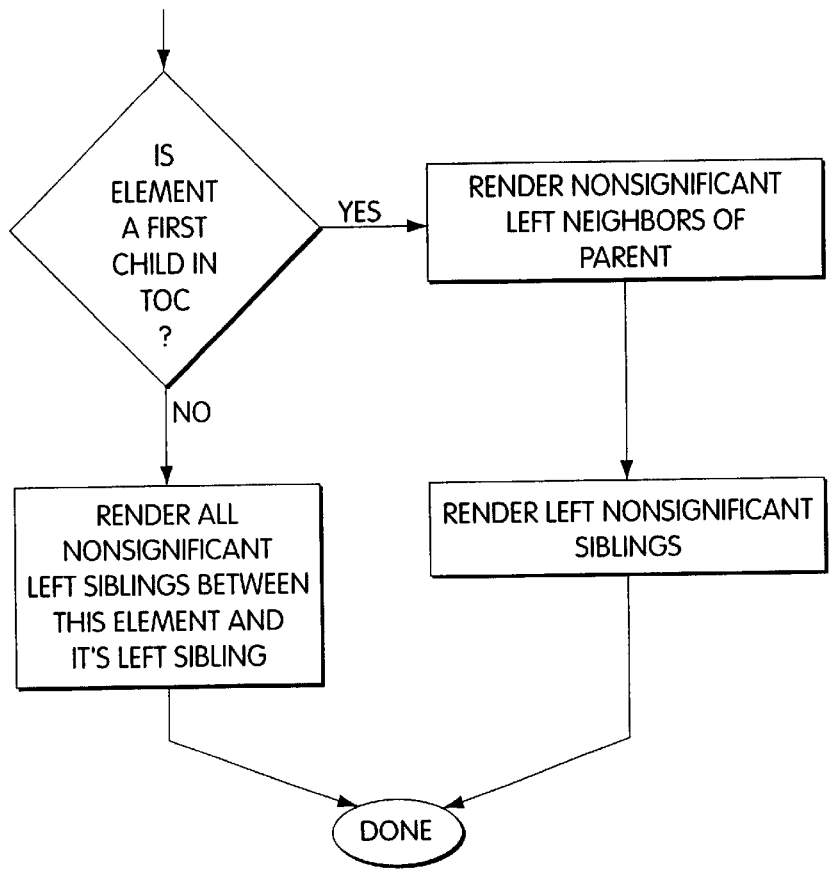
Figure 21:
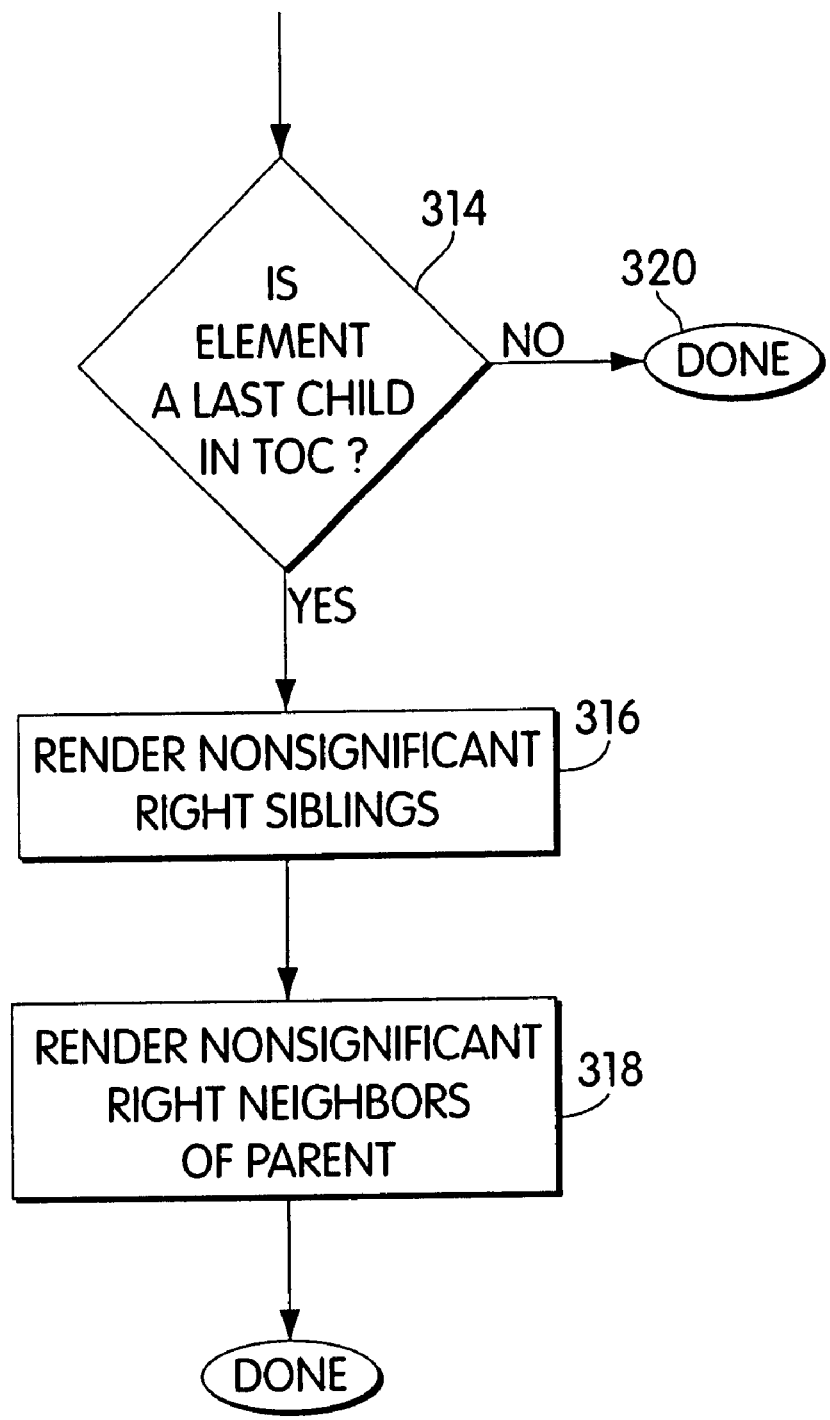

FIG. 16 is a flowchart describing how a table of contents is generated for a document upon receipt of an indication of an element within that document. A table of contents is represented using a table of contents directory very similar to the element directory described above. It uses the same element identifier numbers as well. However, only those elements which have titles are considered to be elements of the table of contents tree. Thus, only the chapter and section tags in a sample document of FIG. 5 will be included in the table of contents. For the purposes of processing a table of contents, a style definition for an element also includes a field that identifies the element containing the actual text of the title, herein called a title bearer, for the element which is a titled element. Generally, the title bearer of a titled element is the first child of the title element or has some other fixed relationship.

In general, the goal of the table of contents display is to retrieve the title information for the siblings of the selected element, the children of the selected element, and the siblings of all ancestors of the selected element, but not the children of any of these ancestor siblings. In other words, if the selected portion of the table of contents to be expanded is a section within one chapter of a ten chapter book, which is a volume of a five volume set, the table of contents will indicate the titles of: all of the volumes in the set, all of the chapters in the selected book, and all of the sections within the chapter containing the selected section as well as all of the subsections of the selected section.

The first step of preparing the table of contents is identifying all the ancestors of the selected element with titles as indicated by step 270 in FIG. 16. These can be placed on a stack in a reverse traversal of the tree. Next, for each ancestor, the title information of all of its left siblings is then obtained and processed. After processing all of the left sisters, the children of all of the selected elements are then processed after processing of the selected elements left siblings. After processing the selected element, the right siblings of all of the ancestors are then processed in step 278. Processing and display of either or both of the left and right siblings of ancestor elements is optional.

The resulting table of contents document preferably makes the printed titles of each section into hypertext links to those sections. These are generated by the following markup in HTML: <A HREF=http://www.ebt.com/pro/abook#EID(x)> "Title of element" </A>, where x is the element identifier of the titled element and "Title of element" is its title obtained from the title bearing element.

For each of the ancestors and their siblings, it may also be desirable to place an indicator in the displayed table of contents to show whether further expansion of that level of the tree is possible within the table of contents structure. An element has this status when any of its children are titled and have corresponding title bearing elements. The indicator may be represented in the resulting table of contents document as a hypertext link that is a request to the server to further expand the table of contents based on the indicated element. Such a request is in the form of a document locator and element locator where the element locator indicates that a table of contents is desired, e.g., http://www.ebt.com/pro/abook#TOC(3).

When full-text searching capabilities are being used, an indication of the number of occurrences of a particular word can also be provided before each element in the table of contents. For example, a variable called "search-active" can be set when a search has been performed. If this variable is set, then before each title in the table of contents the following string can be inserted: "<B> # </B>", where # indicates the number of occurrences of the word in the current element, as determined by the table of FIG. 8.

By providing a client server system based on a generalized markup languages such as described above, electronic publishing of documents using a generalized markup language becomes simplified for an environment where a variety of client systems using different markup languages are being used by possible consumers of the published documents. The need to maintain many small documents and to provide navigational documents is eliminated because they can be dynamically generated instead. Additionally, navigational tools such as full text indices and tables of contents can be used to improve information retrieval.

An additional benefit of the present invention is that by using style sheets for header and footer information, arbitrary fragments of a document can have copyright notices placed on them without having to independently create each notice.

Yet another benefit of the present invention is that, by using style sheets to perform down-conversion, a wide variety of effects can be generated including client-aware and conditional effects.

An additional benefit of the present invention is that delimited text, with indications of portions to be displayed in separate display areas on a computer screen, can easily be transmitted, allowing simultaneous viewing of a document fragment and a navigational tool or of two document fragments.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A server system for use in a client-server computer system for providing access to electronically published documents stored on the server system and written in a first markup language, said access being provided through a client system which receives documents in a second markup language, comprising:

means for defining a mapping table between elements in the first markup language and elements in the second markup language;

means for receiving requests from the client system for at least a portion of at least one of the electronically published documents; and means for converting the requested portion of the at least one of the electronically published documents from the first markup language to the second markup language using the mapping table and for transmitting the converted document to the client system.

2. The server of claim 1 wherein the means for transmitting includes:

means for receiving requests from the client system for at least a portion of at least one of the electronically published documents;

means for transmitting a summary view of the at least one of the electronically published documents containing the requested portion;

means for transmitting a delimiter signal to the client to request a separate display area; and means for transmitting the requested document portion and the header information to the client system for display in the separate display area.

3. The server of claim 1 wherein the server system is connected to the client system via a computer network.

4. The server of claim 1 wherein the first markup language is SGML and the second markup language is HTML.

5. The server of claim 1 further comprising:

means for determining a length of the requested portion of the electronically published document; and means for sending a table of contents of the requested portion if the determined length of the requested portion is greater than a given threshold.

6. The server of claim 1 further comprising:

means for generating header information in the second markup language and corresponding to the requested document; and means for appending the header information to the portion of the document in the second markup language.

7. The server of claim 6 wherein the header information is a copyright notice.

8. The server of claim 1 further comprising:

means for detecting an identity of the client system; and wherein the means for converting converts the portion of the requested document according to the detected identity of the client system.

9. The server of claim 1 wherein the means for converting converts the portion of the requested document according to a type of an element defining the requested document portion.

10. A process performed by a server system in a client-server computer system for providing access to electronically published documents stored on the server system and written in a first markup language, said access being provided through a client system which receives documents in a second markup language, wherein the server has a mapping table between elements in the first markup language and elements in the second markup language, the process comprising:

the step of receiving requests from the client system for at least a portion of at least one of the electronically published documents;

the step of converting the requested portion of the at least one of the electronically published documents from the first markup language to the second markup language using the mapping table; and the step of transmitting the converted document to the client system.

11. The process of claim 10 further comprising:

the step of determining a length of the requested portion of the electronically published document; and the step of sending a table of contents of the requested portion if the determined length of the requested portion is greater than a given threshold.

12. The process of claim 10 further comprising:

the step of generating header information in the second markup language and corresponding to the requested document; and the step of appending the header information to the portion of the document in the second markup language.

13. The process of claim 12 wherein the header information is a copyright notice.

14. The process of claim 10 further comprising the step of detecting an identity of the client system; and wherein the step of converting includes the step of converting the portion of the requested document according to the detected identity of the client system.

15. The process of claim 10, wherein the step of converting includes converting the portion of the requested document according to a type of an element defining the requested document portion.

16. A server system for use in a client-server computer system for providing access to electronically published documents stored on the server system and written in a markup language, said access being provided through a client system, comprising:

means for receiving requests from the client system for at least a portion of at least one of the electronically published documents;

means for generating header information corresponding to the requested document portion;

means for appending the header information to the requested document portion; and means for transmitting the requested document portion and the header information to the client system.

17. The server of claim 16 wherein the header information is a copyright notice.

18. A process for a server system for use in a client-server computer system for providing access to electronically published documents stored on the server system and written in a markup language, said access being provided through a client system, comprising:

the step of receiving requests from the client system for at least a portion of at least one of the electronically published documents;

the step of generating header information to the requested document portion;

the step of appending the header information to the requested document portion; and the step of transmitting the requested document portion and the header information to the client system.

19. The process of claim 18, wherein the header information is a copyright notice.

* * * * *